United States Patent
Watanabe

(10) Patent No.: US 10,132,674 B2
(45) Date of Patent: Nov. 20, 2018

(54) LOADING WEIGHT DETECTION DEVICE FOR WEIGHING CARGO OF A MOBILE BODY

(71) Applicant: National University Corporation Tokyo University of Marine Science and Technology, Tokyo (JP)

(72) Inventor: Yutaka Watanabe, Tokyo (JP)

(73) Assignee: National University Corporation Tokyo University of Marine Science and Technology, Tokyo (JP)

( * ) Notice: Subject to any disclaimer, the term of this patent is extended or adjusted under 35 U.S.C. 154(b) by 166 days.

(21) Appl. No.: 15/031,735

(22) PCT Filed: Oct. 22, 2014

(86) PCT No.: PCT/JP2014/078017
§ 371 (c)(1),
(2) Date: Apr. 23, 2016

(87) PCT Pub. No.: WO2015/060319
PCT Pub. Date: Apr. 30, 2015

(65) Prior Publication Data
US 2016/0265960 A1    Sep. 15, 2016

(30) Foreign Application Priority Data
Oct. 23, 2013    (JP) .................. 2013-220098

(51) Int. Cl.
*G01G 19/08* (2006.01)
*G01G 19/02* (2006.01)
*G01G 3/16* (2006.01)

(52) U.S. Cl.
CPC ........... *G01G 19/022* (2013.01); *G01G 19/08* (2013.01); *G01G 19/086* (2013.01); *G01G 3/16* (2013.01)

(58) Field of Classification Search
CPC ........ G01G 3/16; G01G 19/022; G01G 19/08; G01G 19/086; B60G 2400/60; B60G 2400/61
See application file for complete search history.

(56) References Cited

U.S. PATENT DOCUMENTS 5,973,273 A * 10/1999 Tal .................... G01G 19/08 177/1
6,646,210 B1 * 11/2003 Wissing ............. G01G 19/08 177/136

(Continued)

FOREIGN PATENT DOCUMENTS

JP    H05-286323 A    11/1993
JP    H09-061226 A    3/1997

(Continued)

*Primary Examiner* — Natalie Huls
(74) *Attorney, Agent, or Firm* — Hawaii Patent Services; Nathaniel K Fedde

(57) ABSTRACT

A loading weight detection device applicable to various mobile bodies can accurately detect loading weight with minimized number of input variables. It includes a touch panel 33 receiving input of vehicle body weight $m_a$ and initial setting cargo weight $m_{b0}$; an oscillation detection part 20 detecting cargo vehicle oscillation; an arithmetic part 31 functioning as natural vibration identifying means for identifying natural vibration in self-weight direction as vertical oscillation center-of-gravity-specific natural vibration value, based on oscillation data detected by an oscillation detection part 20; a storage part 32 storing vertical oscillation center-of-gravity-specific natural vibration value identified by an arithmetic part 31 with cargo having initial setting cargo weight of $m_{b0}$ loaded on cargo vehicle, vehicle body weight $m_a$, and initial setting cargo weight $m_{b0}$ as initial setting data, arithmetic part 31 calculating total weight M, being based on vertical oscillation center-of-gravity-specific natural vibration value identified and initial setting data.

4 Claims, 23 Drawing Sheets

(56) References Cited

U.S. PATENT DOCUMENTS

| | | | |
|---|---|---|---|
| 7,472,002 B2 * | 12/2008 | McCann | B60G 17/01908 |
| | | | 701/37 |
| 7,865,296 B2 * | 1/2011 | Ryu | G01M 1/122 |
| | | | 701/1 |
| 9,020,658 B2 * | 4/2015 | Karl | G06F 17/00 |
| | | | 701/1 |
| 2009/0119000 A1 * | 5/2009 | Baumann | B60G 17/0162 |
| | | | 701/124 |
| 2011/0178673 A1 * | 7/2011 | Nakamura | G01G 3/16 |
| | | | 701/31.4 |
| 2013/0132025 A1 | 5/2013 | Watanabe | |
| 2014/0278040 A1 * | 9/2014 | Singh | G01M 17/06 |
| | | | 701/124 |
| 2015/0217688 A1 * | 8/2015 | Schneider | G01G 19/086 |
| | | | 73/117.03 |
| 2016/0114809 A1 * | 4/2016 | Savaresi | G01G 19/086 |
| | | | 702/41 |

FOREIGN PATENT DOCUMENTS

| | | |
|---|---|---|
| JP | 2011-149761 A | 8/2011 |
| JP | 2013-083483 A | 5/2013 |
| WO | WO2008062867 A1 | 5/2008 |
| WO | WO2011145332 A1 | 11/2011 |

* cited by examiner

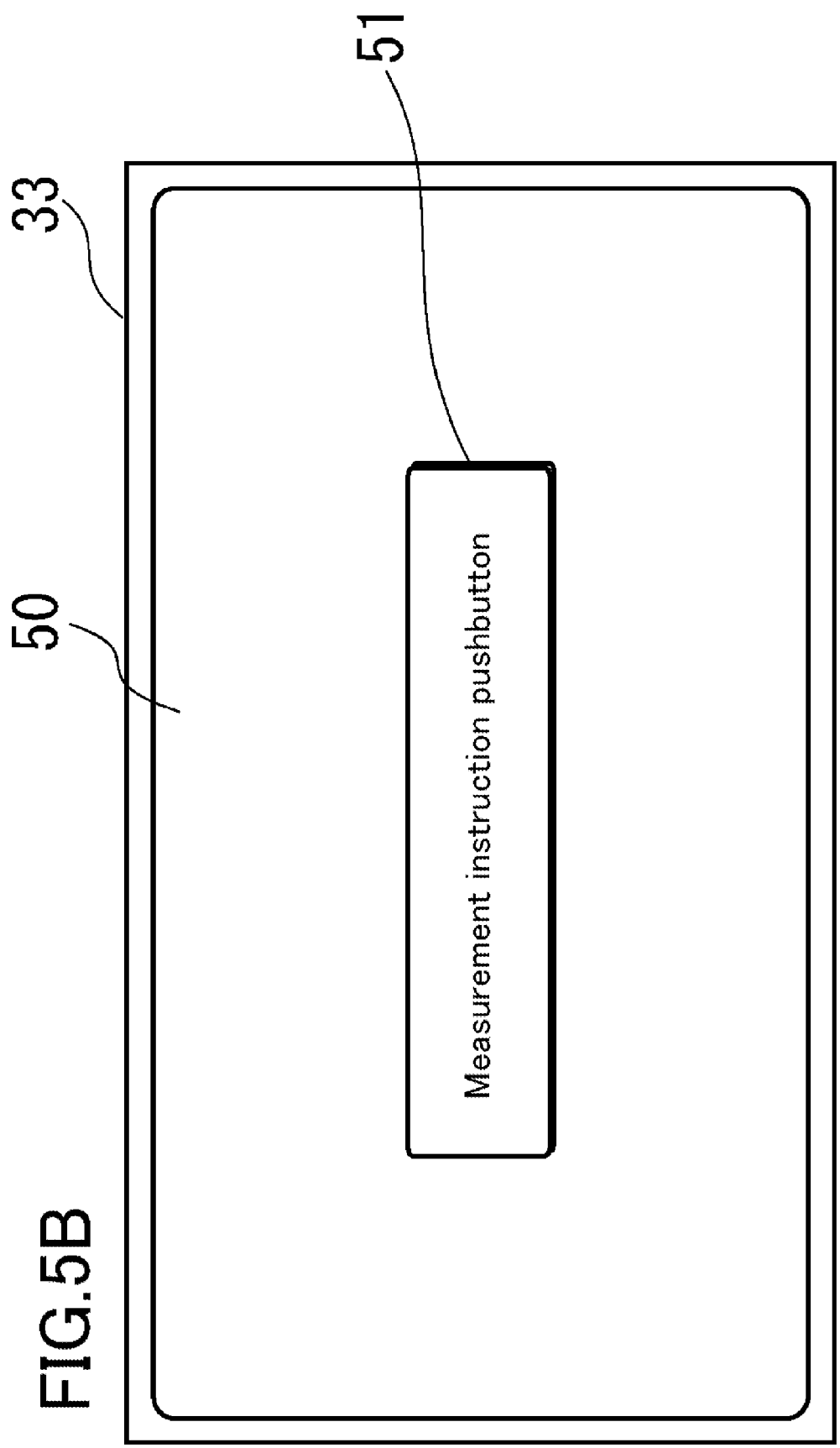

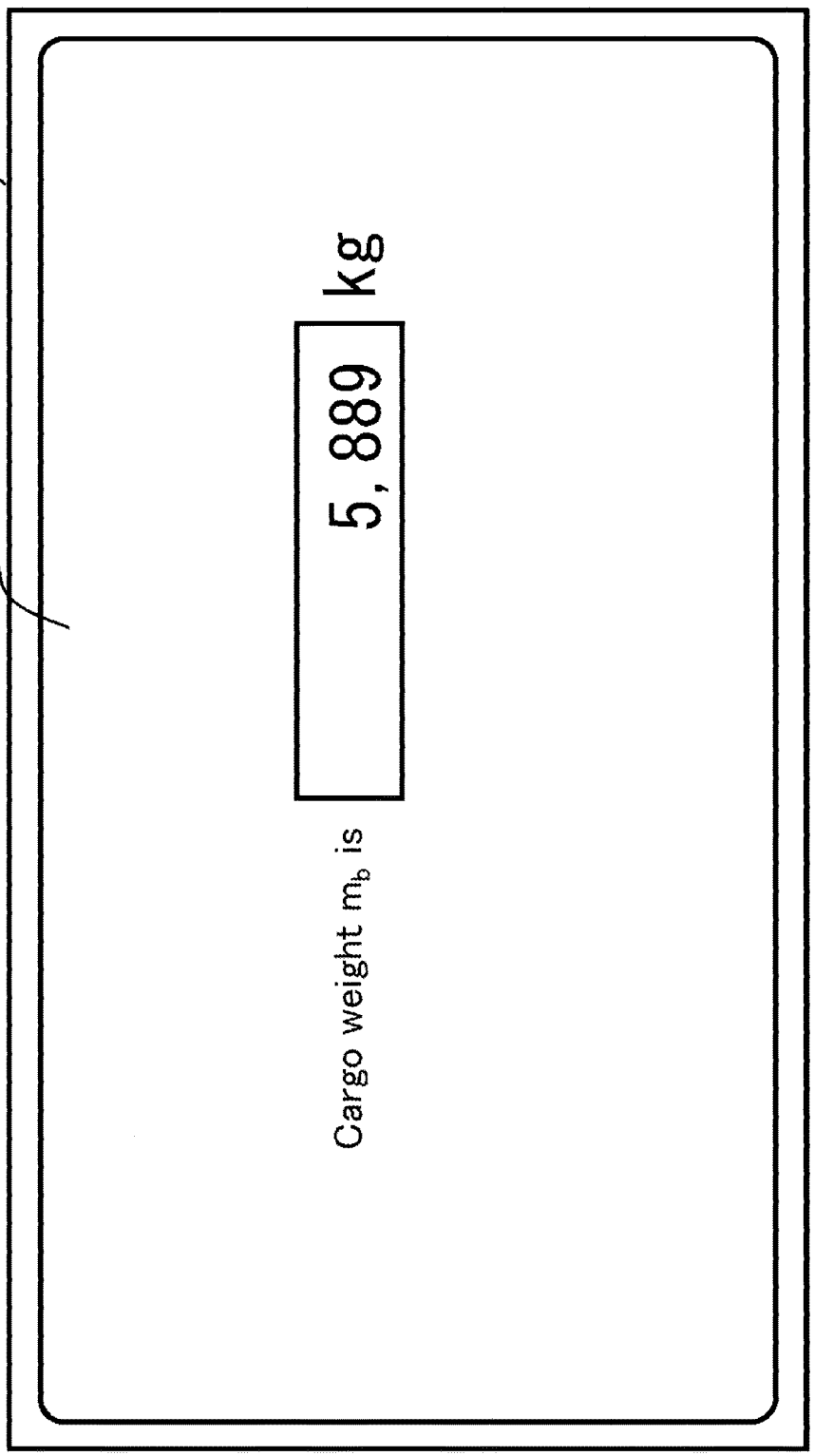

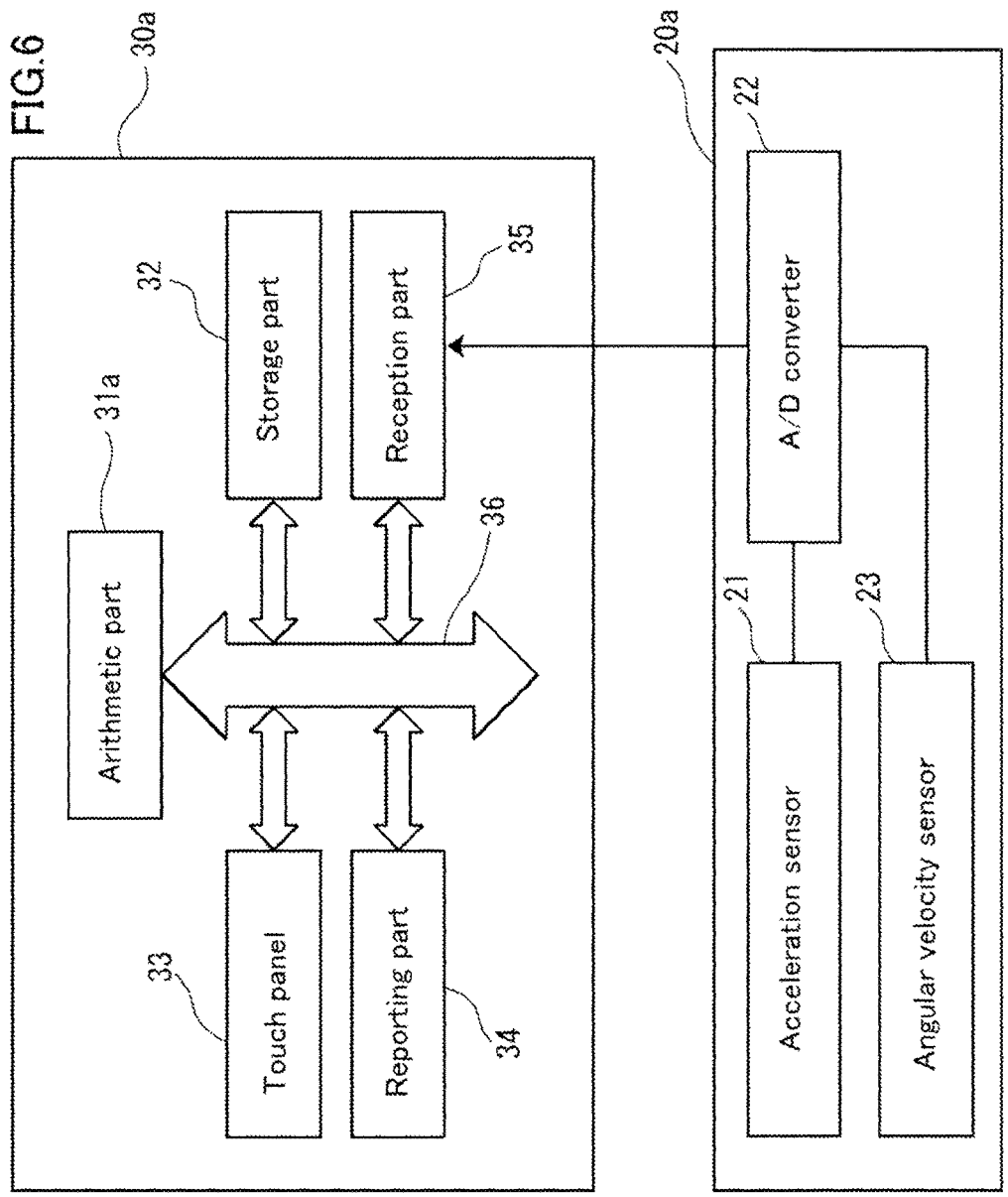

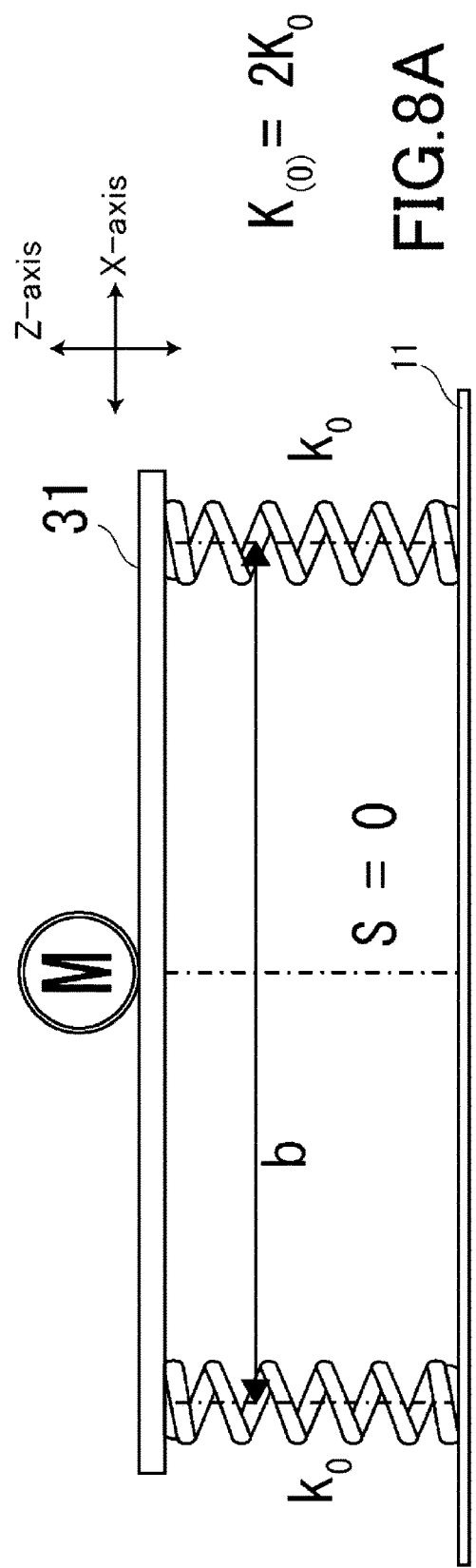

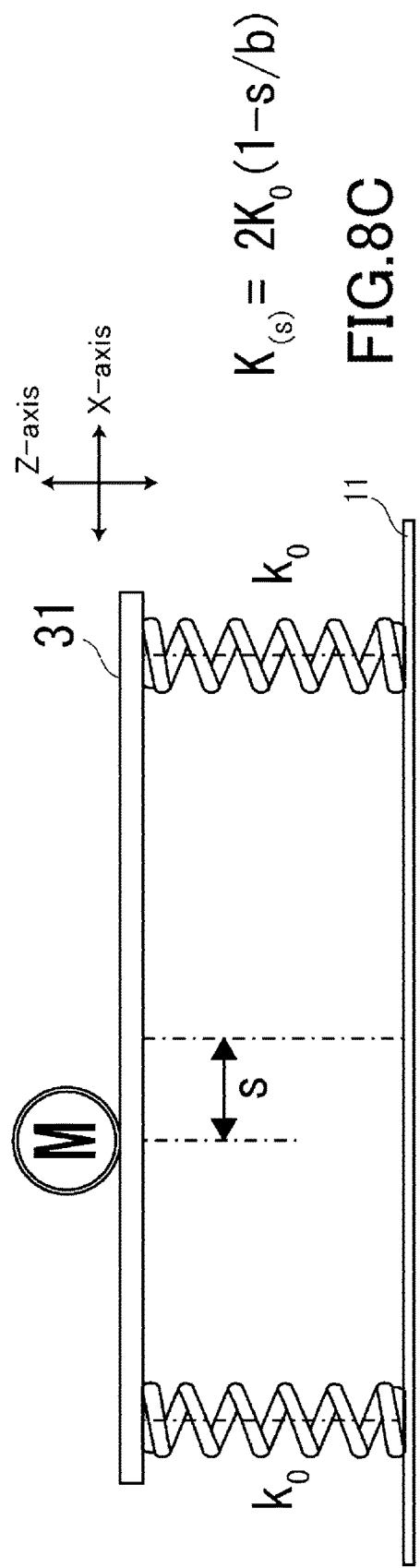

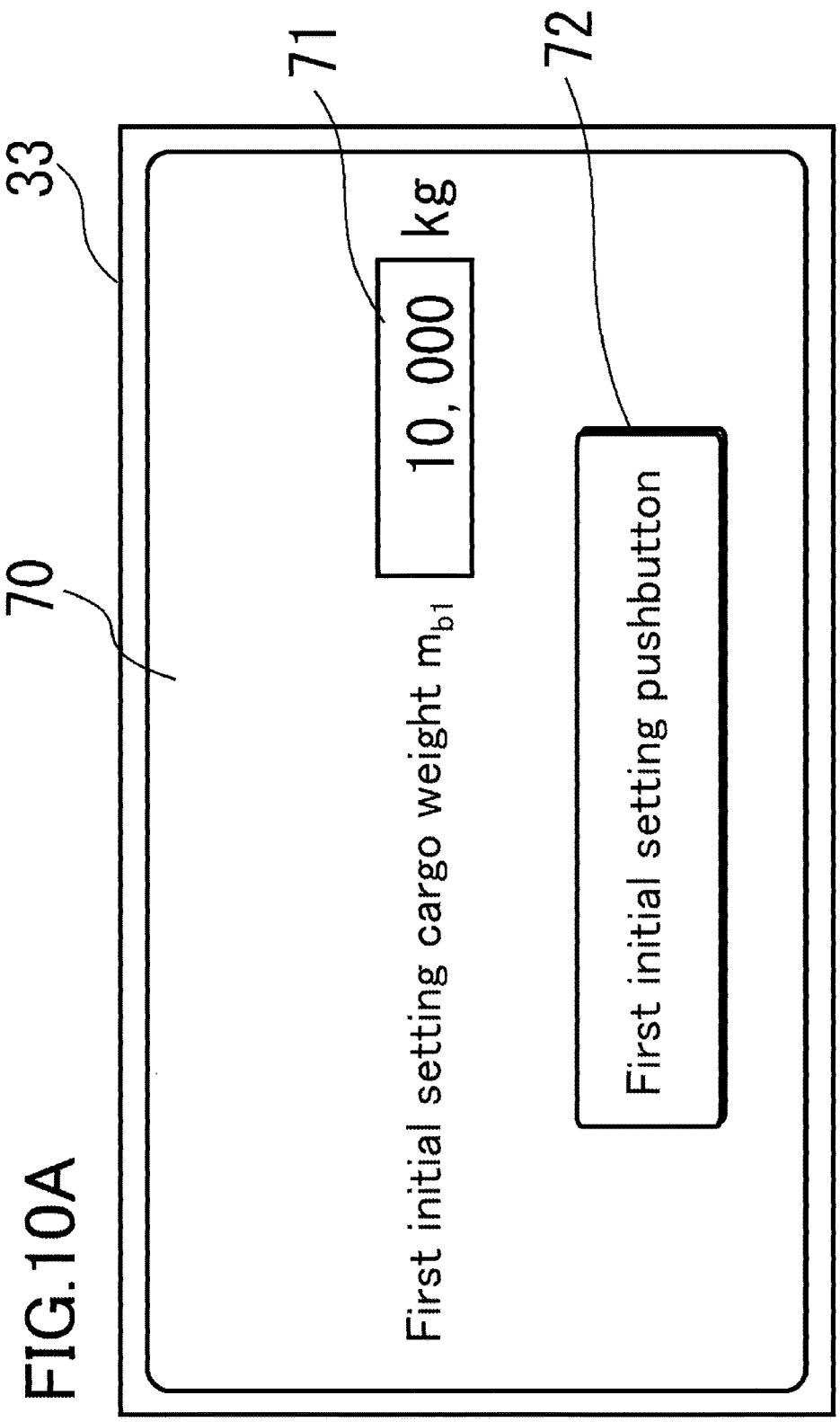

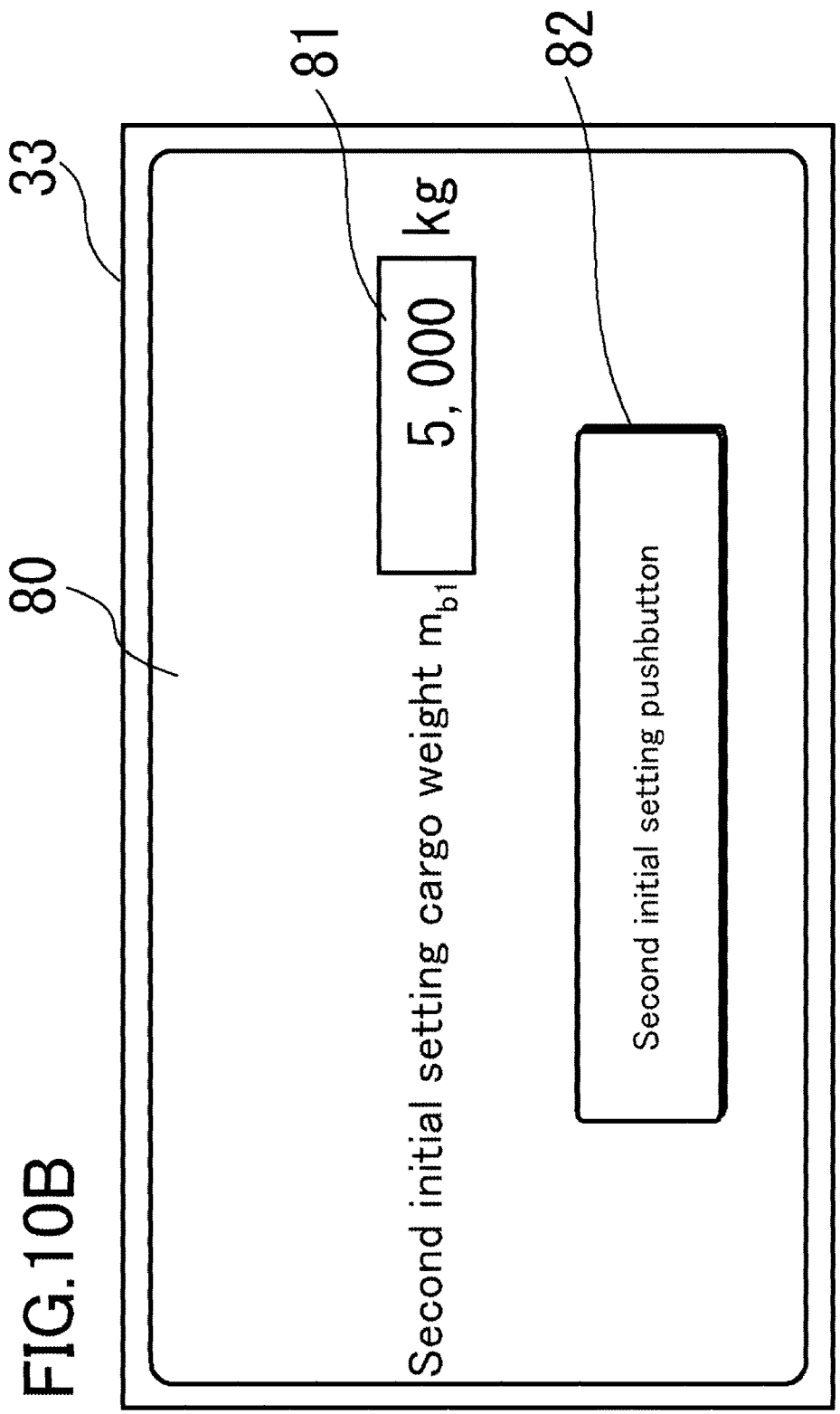

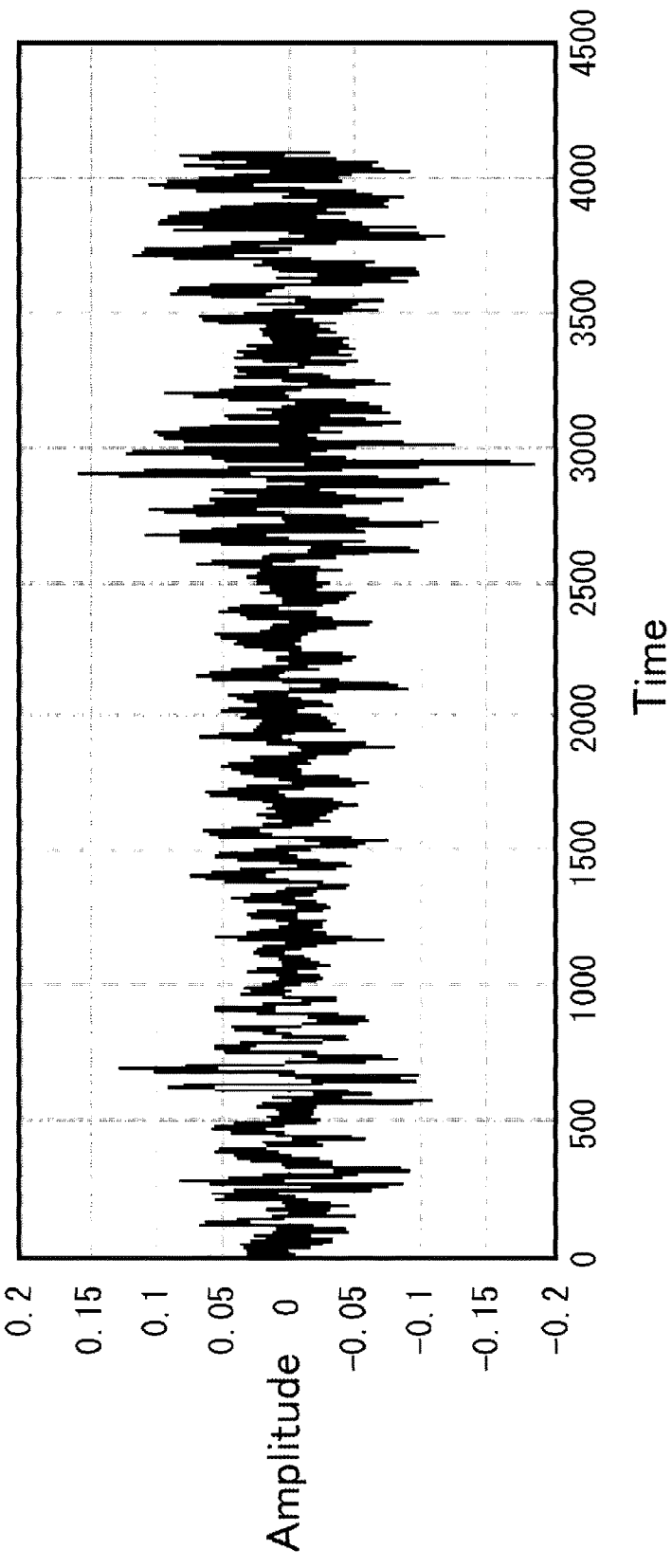

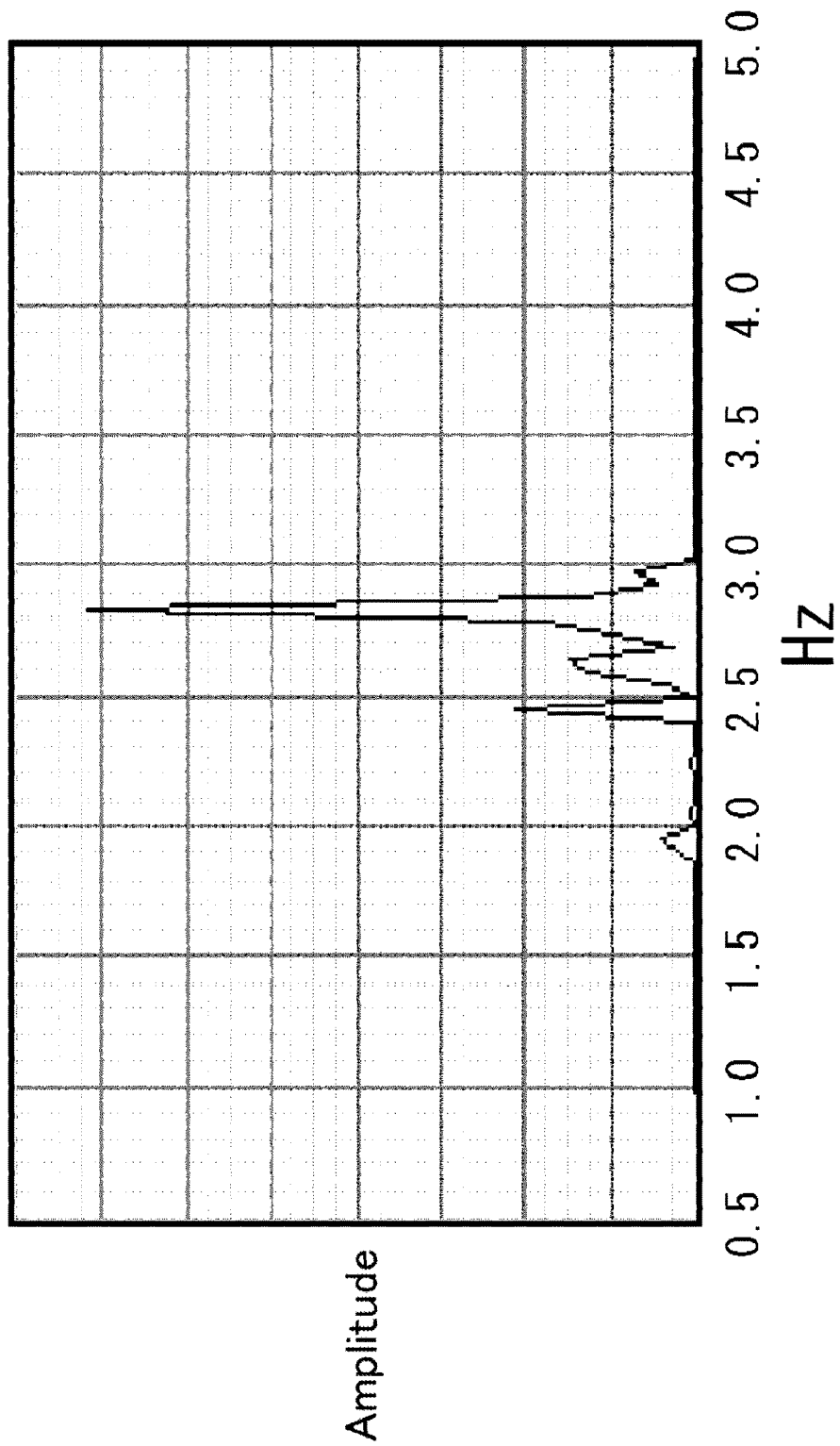

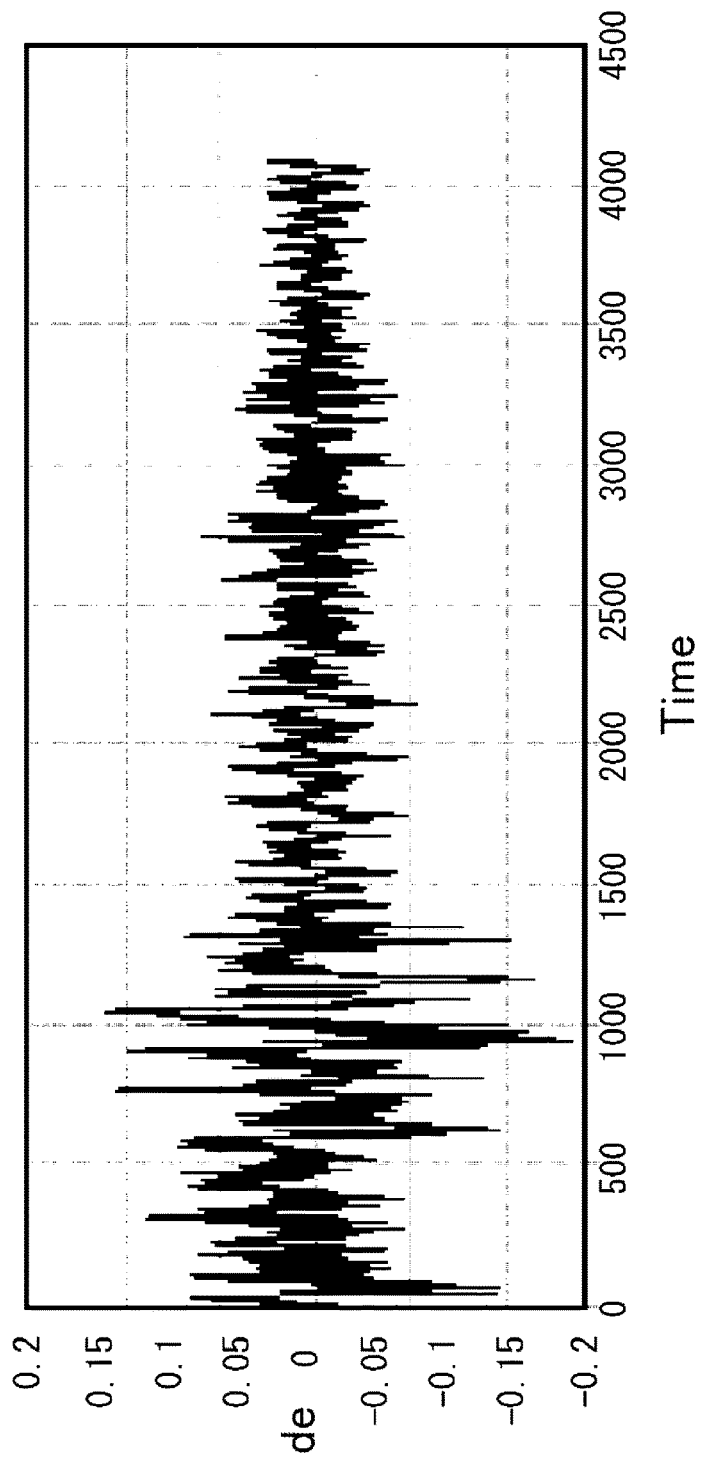

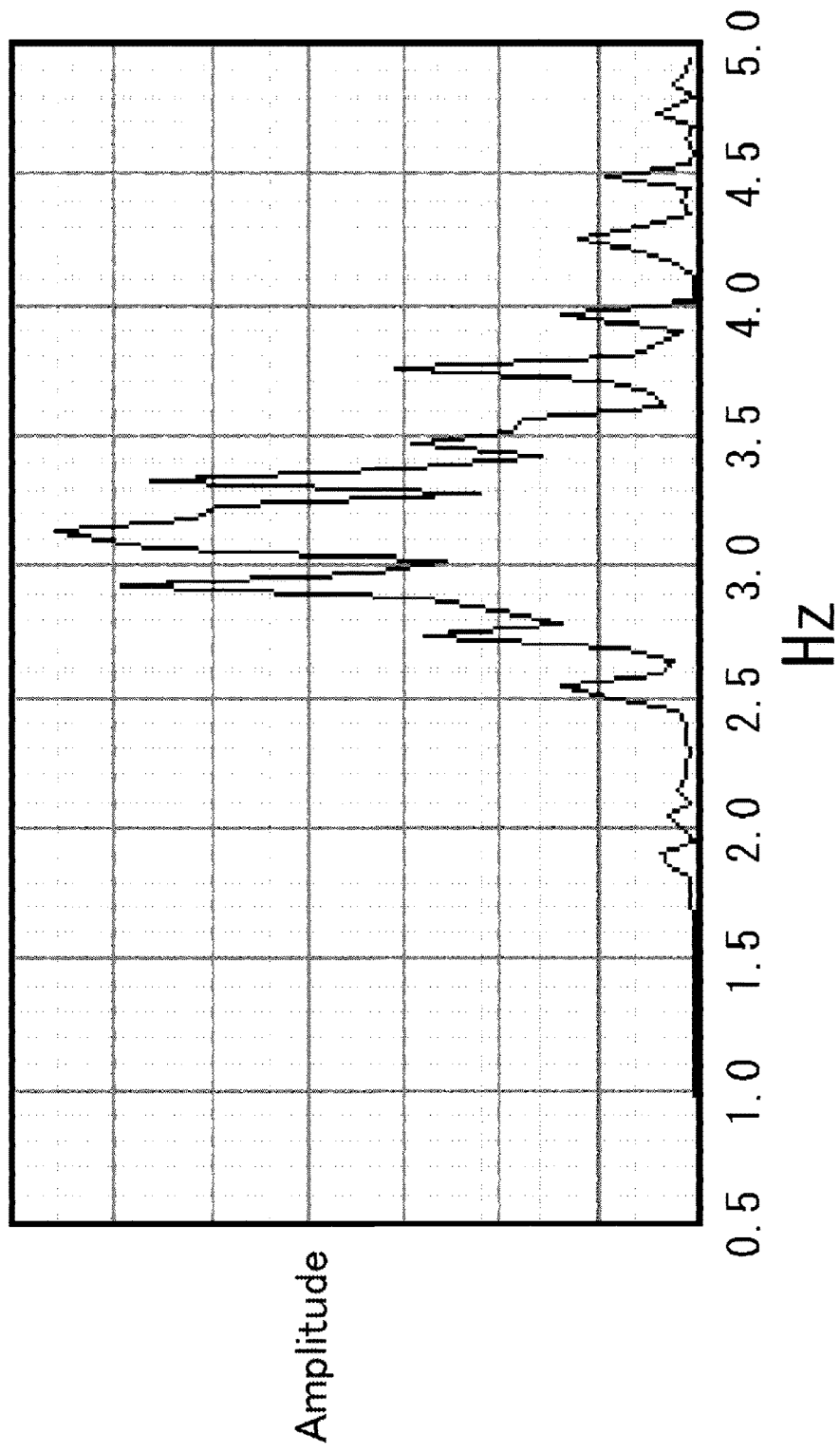

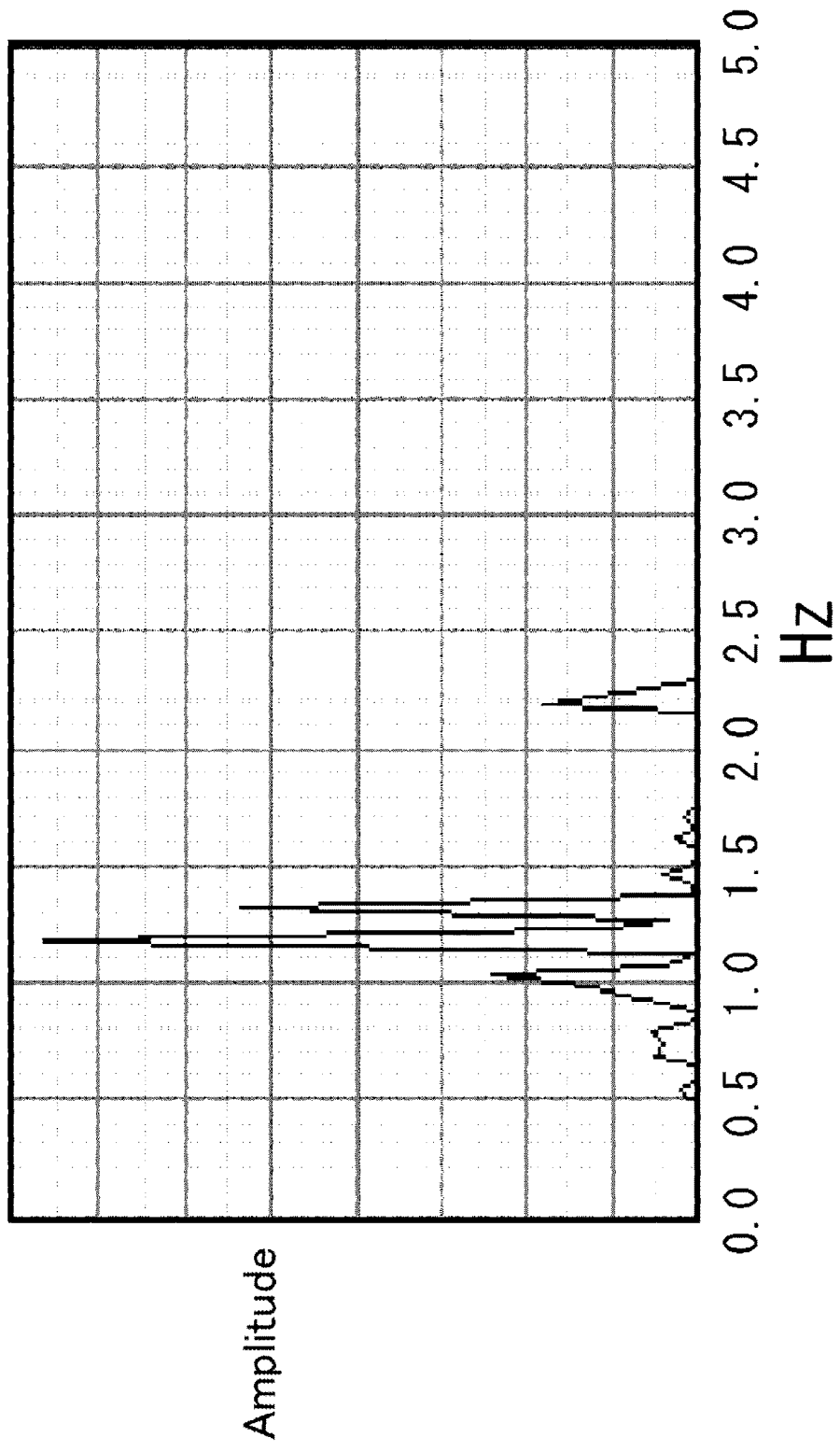

LOADING WEIGHT DETECTION DEVICE FOR WEIGHING CARGO OF A MOBILE BODY

TECHNICAL FIELD

The present invention relates to a loading weight detection device that detects the weight of mobile bodies, such as automobiles and railway vehicles, that load a cargo.

BACKGROUND ART

Detection of a weight of mobile bodies, such as automobiles and railway vehicles, that load a cargo is generally performed in a static environment using a load cell. Various techniques for detecting a weight of a mobile body itself and that of a loading cargo during traveling have been proposed, however, at present, they have not yet been established (made possible to be put into practical use and commercialized). Then, the present applicant has proposed a cargo weight prediction device that, by applying the center-of-gravity detection theory, predicts the weight of a cargo that is loaded on a trailer truck (for example, refer to Patent Document 1).

CITATION LIST

Patent Literature

Patent document 1: Japanese Patent No. 4517107

DISCLOSURE OF THE INVENTION

Problem to be Solved by the Invention

However, the cargo weight prediction device is applicable only to trailer trucks, and involves a number of (ten different) input variables, and thus has presented a problem that input operation is complicated, and errors are easily accumulated.

In view of the above problem, the present invention has been made in order to solve the problem of the prior art, and it is an object of the present invention to provide a loading weight detection device that is applicable to a great variety of mobile bodies, and can accurately detect a loading weight with a minimized number of input variables.

Means for Solving the Problem

The loading weight detection device in accordance with the present invention provides a loading weight detection device that detects the cargo weight of a cargo that is loaded on a mobile body, including: an initial setting input means for receiving an input of a vehicle body weight of the mobile body, a breadth between virtual springs in the mobile body, and an initial setting cargo weight of the cargo; an oscillation detection means for detecting an oscillation of the mobile body; a natural vibration identifying means for identifying, on the basis of oscillation data that has been detected by the oscillation detection means, identifying the natural vibration in a self-weight direction of the mobile body as a vertical oscillation center-of-gravity-specific natural vibration value, and identifying the natural vibration around a vehicle axis of the mobile body as a horizontal oscillation center-of-gravity-specific natural vibration value; a storage means for storing the vertical oscillation center-of-gravity-specific natural vibration value and the horizontal oscillation center-of-gravity-specific natural vibration value that have been identified by the natural vibration identifying means with the cargo having the initial setting cargo weight being loaded on the mobile body, and the vehicle body weight, the breadth between the virtual springs, and the initial setting cargo weight that have been received by the initial setting input means as initial setting data; and a total weight calculation means for calculating a total weight of the mobile body that is loaded with the cargo on the basis of the vertical oscillation center-of-gravity-specific natural vibration value and the horizontal oscillation center-of-gravity-specific natural vibration value that have been identified by the natural vibration identifying means and the initial setting data.

Further, with the loading weight detection device in accordance with the present invention, the natural vibration identifying means may apply fast Fourier transformation to time series oscillation data that has been detected by the oscillation detection means to identify the vertical oscillation center-of-gravity-specific natural vibration value and the horizontal oscillation center-of-gravity-specific natural vibration value.

Further, with the loading weight detection device in accordance with the present invention, the vertical oscillation center-of-gravity-specific natural vibration value and the horizontal oscillation center-of-gravity-specific natural vibration value that are identified by the natural vibration identifying means may be natural vibration frequencies.

Further, with the loading weight detection device in accordance with the present invention, the total weight calculation means may calculate a total weight of the mobile body in consideration of the height in the vertical direction from the oscillation center axis to the center-of-gravity location of the mobile body, the displacement in the horizontal direction from the oscillation center axis to the center-of-gravity location of the mobile body, and the static inclination angle of a cargo bed in the mobile body.

In addition, the loading weight detection device in accordance with the present invention provides a loading weight detection device that detects the cargo weight of a cargo that is loaded on a mobile body, including: an initial setting input means for receiving an input of a vehicle body weight of the mobile body and an initial setting cargo weight of the cargo; an oscillation detection means for detecting an oscillation of the mobile body; a natural vibration identifying means for identifying, on the basis of oscillation data that has been detected by the oscillation detection means, identifying the natural vibration in a self-weight direction of the mobile body as a vertical oscillation center-of-gravity-specific natural vibration value; a storage means for storing the vertical oscillation center-of-gravity-specific natural vibration value that has been identified by the natural vibration identifying means with the cargo having the initial setting cargo weight being loaded on the mobile body, and the vehicle body weight and the initial setting cargo weight that have been received by the initial setting input means as initial setting data; a total weight calculation means for calculating a total weight of the mobile body that is loaded with the cargo on the basis of the vertical oscillation center-of-gravity-specific natural vibration value that has been identified by the natural vibration identifying means and the initial setting data.

In addition, the loading weight detection device in accordance with the present invention provides a loading weight detection device that detects the cargo weight of a cargo that is loaded on a mobile body, including: an initial setting input means for receiving an input of first and second initial setting cargo weights of the cargo, respectively; an oscillation detection means for detecting an oscillation of the mobile body; a natural vibration identifying means for identifying, on the basis of oscillation data that has been detected by the oscillation detection means, identifying the natural vibration in a self-weight direction of the mobile body as a vertical oscillation center-of-gravity-specific natural vibration value; a vehicle body weight calculation means for calculating a vehicle body weight of the mobile body on the basis of the first and second initial setting cargo weights that have been received by the initial setting input means, a first vertical oscillation center-of-gravity-specific natural vibration value that has been identified by the natural vibration identifying means with the cargo having the first initial setting cargo weight being loaded on the mobile body, and a second vertical oscillation center-of-gravity-specific natural vibration value that has been identified by the natural vibration identifying means with the cargo having the second initial setting cargo weight being loaded on the mobile body;

a storage means for storing the vehicle body weight that has been calculated by the vehicle body weight calculation means, the first initial setting cargo weight that has been received by the initial setting input means, and the first vertical oscillation center-of-gravity-specific natural vibration value that has been identified by the natural vibration identifying means with the cargo having the first initial setting cargo weight being loaded on the mobile body as initial setting data; and a total weight calculation means for calculating a total weight of the mobile body that is loaded with the cargo on the basis of the vertical oscillation center-of-gravity-specific natural vibration value that has been identified by the natural vibration identifying means and the initial setting data.

Further, with the loading weight detection device in accordance with the present invention, the natural vibration identifying means may apply fast Fourier transformation to time series oscillation data that has been detected by the oscillation detection means to identify the vertical oscillation center-of-gravity-specific natural vibration value.

Further, with the loading weight detection device in accordance with the present invention, the vertical oscillation center-of-gravity-specific natural vibration value that is identified by the natural vibration identifying means may be a natural vibration frequency.

Advantages of the Invention

In accordance with the present invention, there are provided advantages of being applicable to a great variety of cargo vehicles, and that, simply by inputting the vehicle body weight of a moving body and the initial setting cargo weight of a cargo as input variables, the loading weight can be accurately detected.

BRIEF DESCRIPTION OF THE DRAWINGS

FIG. 6 is a block diagram illustrating a configuration of the loading weight detection device according to the second embodiment of the present invention;

FIG. 10 is a figure illustrating an example of display screen that is displayed in the touch panel shown in FIG. 2;

FIG. 11 is a graph showing an example of time series oscillation data in an up-down direction that has been obtained in a demonstration test of the loading weight detection device according to the first embodiment of the present invention.

BEST MODE FOR CARRYING OUT THE INVENTION

Next, embodiments of the present invention will be specifically explained with reference to the drawings.

(First Embodiment)

Figure 1:
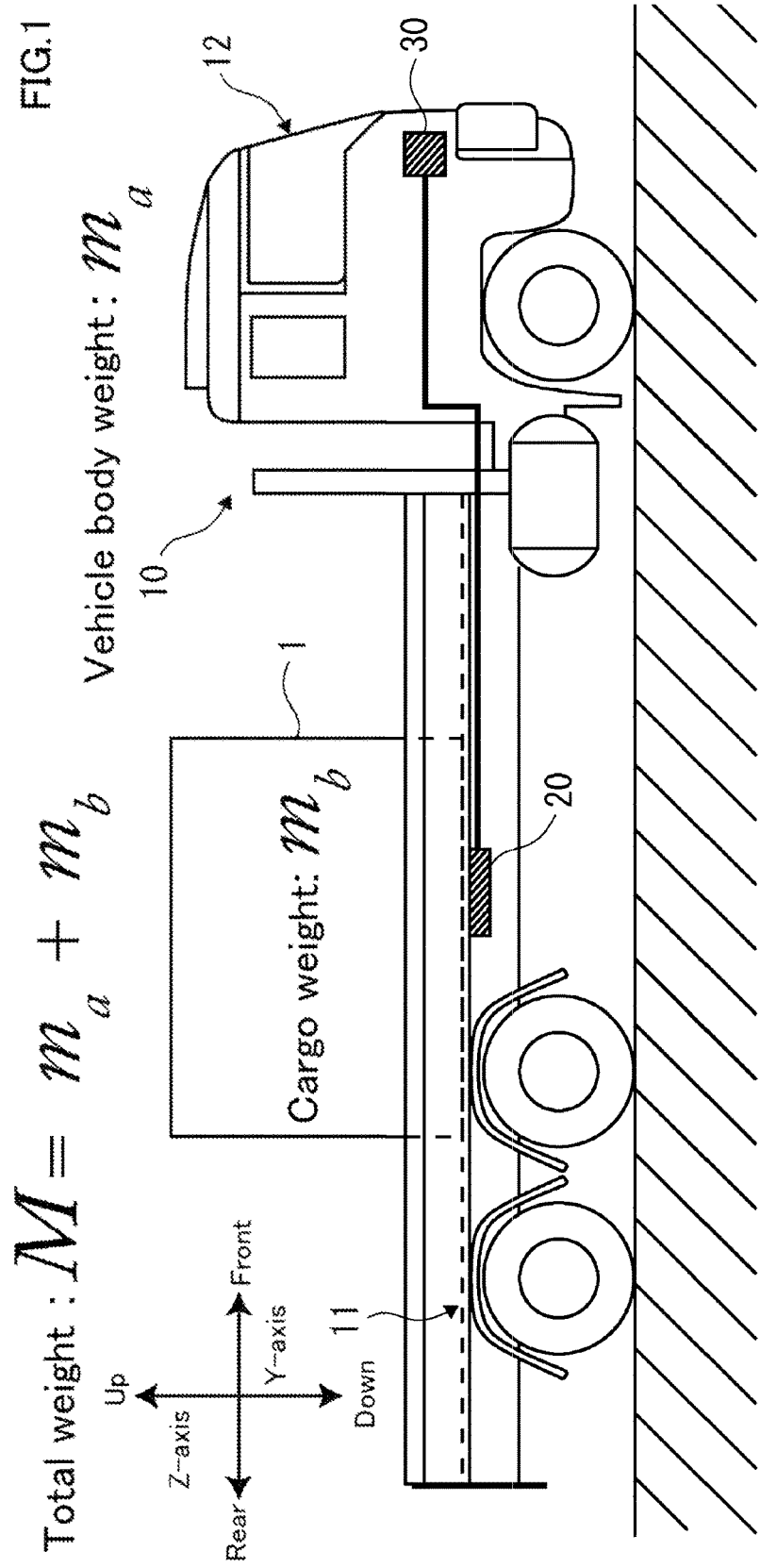
FIG. 1 is a side view of a cargo vehicle on which a loading weight detection device according to a first embodiment of the present invention is installed.
Figure 2:
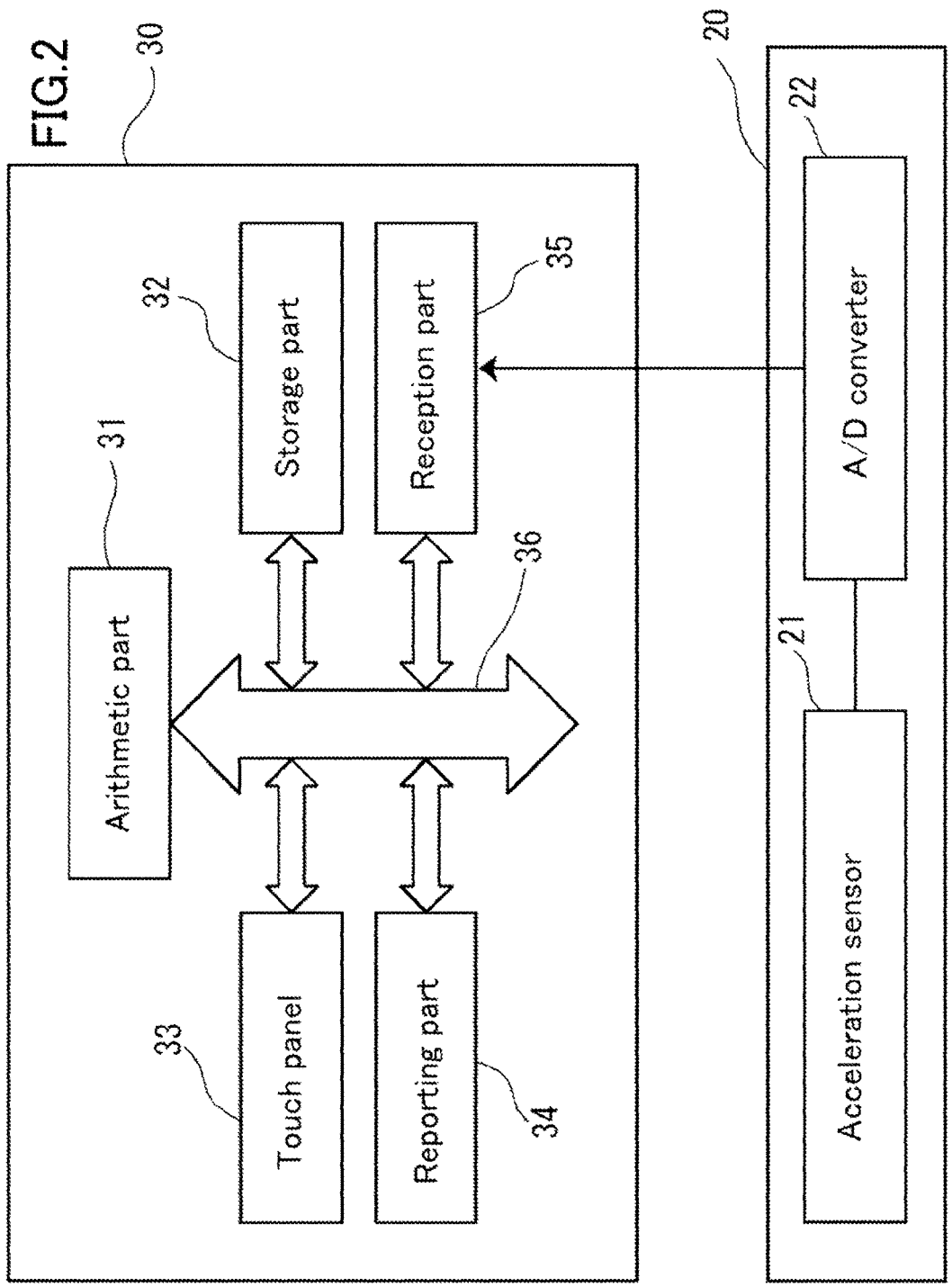
FIG. 2 is a block diagram illustrating a configuration of the loading weight detection device according to the first embodiment of the present invention.

With reference to FIG. 1 and FIG. 2, a loading weight detection device of a first embodiment is a device that detects the total weight M of a cargo vehicle (truck) 10, and includes a vibration detection part 20 and a data processing part 30. The total weight M (strictly the total mass) of the cargo vehicle 10 is a value of sum of the vehicle body weight $m_a$ of the cargo vehicle 10 and the cargo weight $m_b$ of the cargo 1 loaded on the cargo bed 11 of the cargo vehicle 10, and when the vehicle body weight $m_a$ is known, the cargo weight $m_b$ is detected as a result. In the first embodiment, the direction perpendicular to the cargo bed 11 is defined as an up-down direction; the direction along the longitudinal width of the cargo vehicle 10 as a front-rear direction; and the direction along the crosswise width of the cargo vehicle 10 as a right-left direction. In addition, the self-weight direction in which the gravity acts is defined as a Z-axis direction; the direction which is orthogonal to the Z-axis direction and the front-rear direction as an X-axis direction; and the direction which is orthogonal to the Z-axis direction and the right-left direction as a Y-axis direction. In the state in which the load-carrying platform 12 is level, the up-down direction coincides with the Z-axis direction; the front-rear direction with the Y-axis direction; and the right-left direction with the X-axis direction, respectively.

Figure 3:
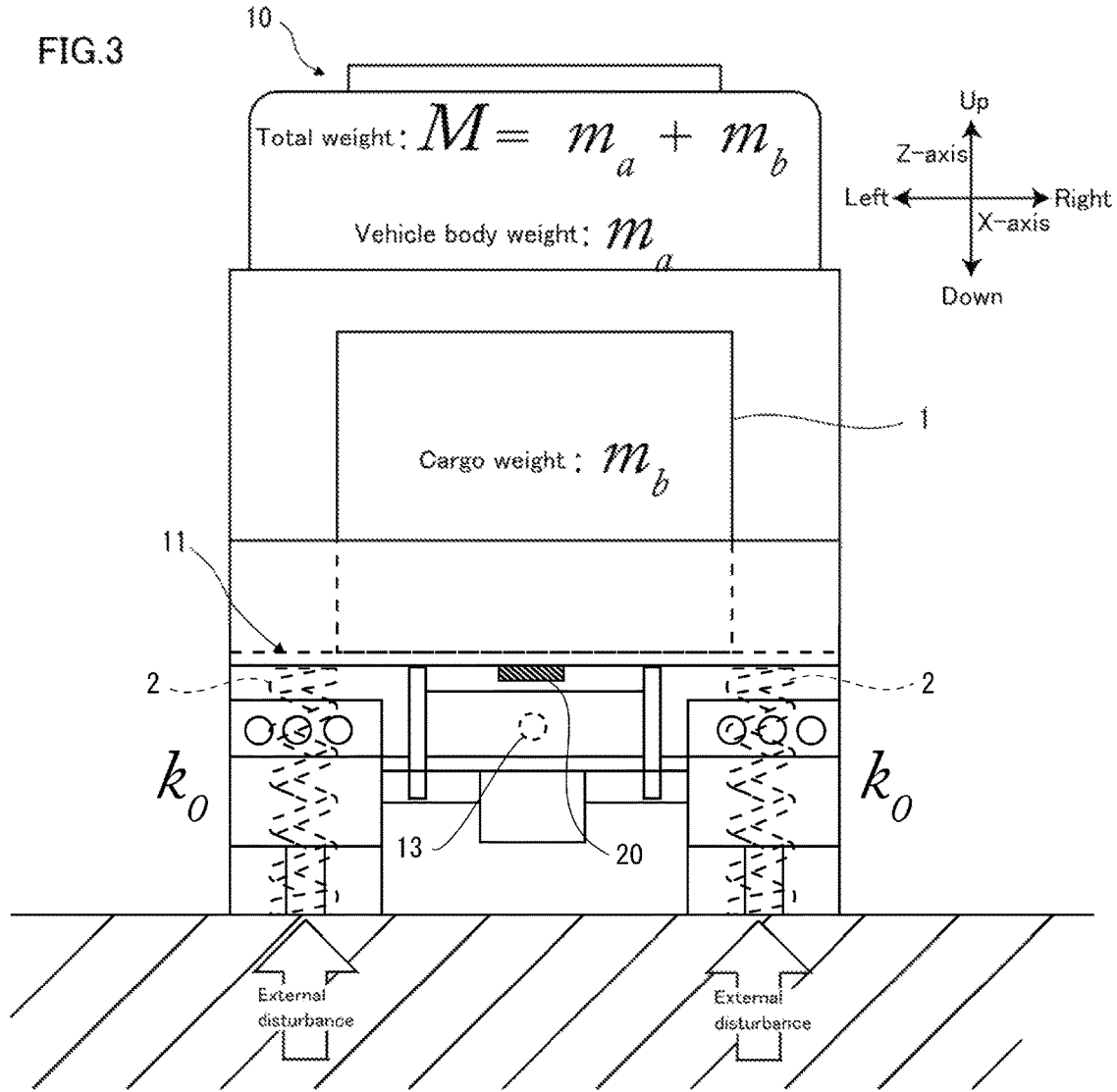
FIG. 3 is a rear view of a cargo vehicle illustrating an example of installation of the loading weight detection device shown in FIG. 1.

The vibration detection part 20 includes an acceleration sensor 21 and an A/D converter 22, being installed in a location where the oscillation of the cargo bed 11 of the cargo vehicle 10 in an up-down direction can be detected. As shown in FIG. 3, the cargo vehicle 10 is supported on both sides of a vehicle axis 13 by the elastic force for buffering, respectively, that is given by a tire or a suspension that can be regarded as a virtual spring 2. Therefore, the cargo bed 11 of the cargo vehicle 10, which is a mobile body, produces a natural vibration according to the total weight M of the cargo vehicle 10 during traveling with an external disturbance from the ground being applied thereto. Such natural vibrations can be divided into broad general categories of linear motion and rotary motion, and the natural vibration that is directly produced according to the total weight M of the cargo vehicle 10 is a simple harmonic motion in a self-weight direction (the Z-axis direction).

With the acceleration sensor 21, the sensitivity axis is adjusted such that the oscillation of the cargo bed 11 in the up-down direction is detected, and the oscillation in the up-down direction of the cargo bed 11 is detected as an oscillation in a self-weight direction (the Z-axis direction) of the cargo bed 11, while the A/D converter 22 converts oscillation data (a result of detection) outputted from the acceleration sensor 21 as an analog signal into a digital signal to output it to the data processing apparatus 30. The acceleration sensor 21 is not particularly limited, and, for example, a crystal tuning fork type sensor or an oscillation type sensor may be used, and a three-axis (three dimensional) angular velocity sensor may also be used.

As shown in FIG. 1, the data processing apparatus 30 is installed in, for example, a driver's seat, and with reference to FIG. 2, the data processing apparatus 30 includes an arithmetic part 31 comprised of a microprocessor, and the like; a storage part 32 comprised of an ROM (read-only memory), an RAM (random access memory), and the like; a touch panel 33 functioning as a display part and an input part; a reporting part 34, such as a speaker; and a reception part 35, the respective parts being connected by a bus 36.

In the storage part 32, a calculation program for deriving the total weight M is stored. The arithmetic part 31 stores the output from the acceleration sensor 21 in the storage part 32 for a certain period of time, and according to the calculation program stored in the storage part 32, performs arithmetic processing of the output from the acceleration sensor 21 that is stored in the storage part 32, thereby calculating a value for the total weight M of the cargo vehicle 10. Then, the arithmetic part 31 subtracts the value for the vehicle body weight $m_a$ from the value for the total weight M of the cargo vehicle 10 that has been calculated, thereby calculating a value for the cargo weight $m_b$ and outputting the value by making a display notification through the touch panel 33, or a voice notification through the reporting part 34.

Next, the calculation operation for the loading weight in the first embodiment will be explained in detail with reference to FIG. 4 and FIG. 5.

Figure 4:
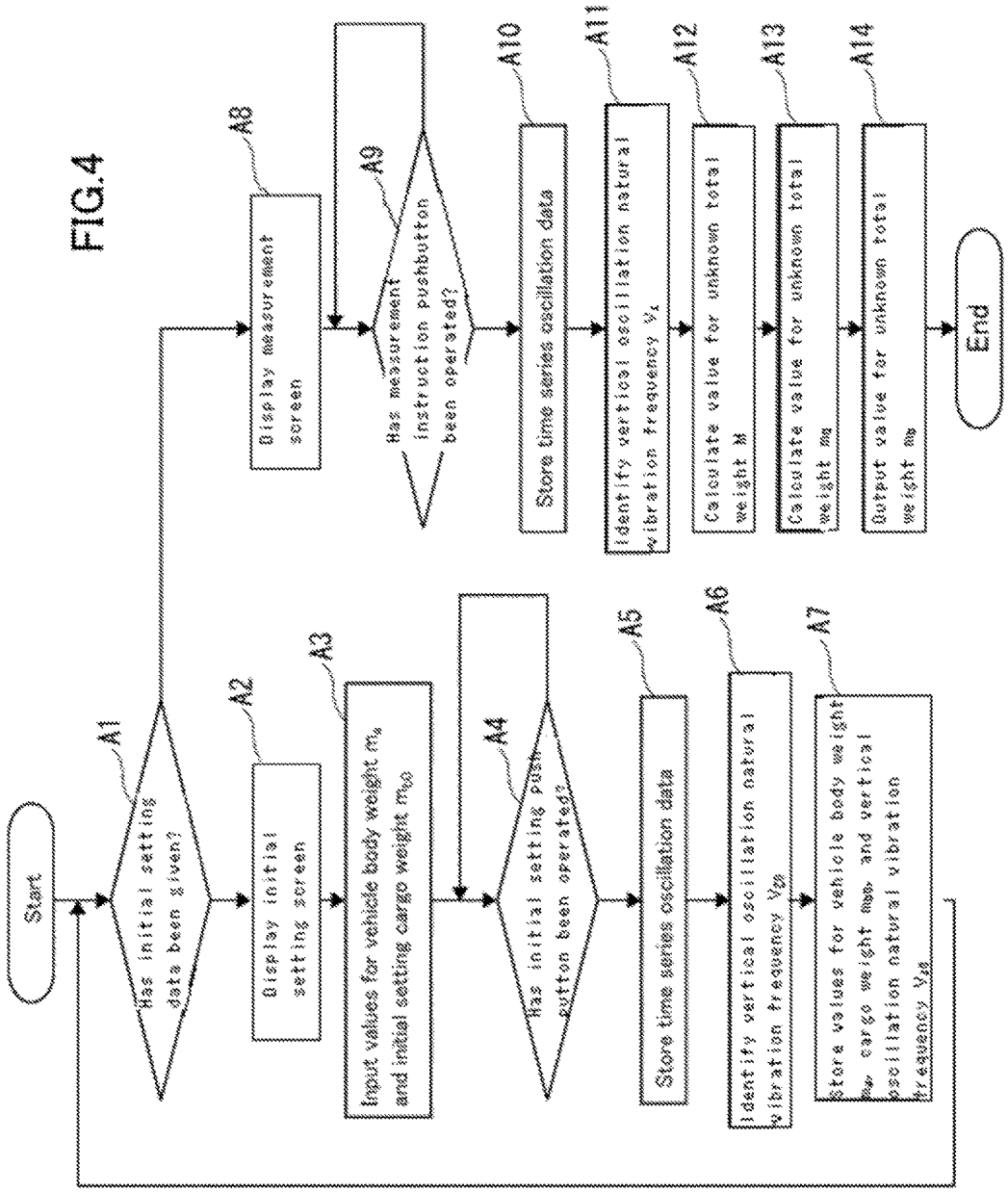
FIG. 4 is a flowchart for explaining the loading weight detecting operation in the loading weight detection device according to the first embodiment of the present invention.

With reference to FIG. 4, when, being interlocked with the start of the engine of the cargo vehicle 10, for example, the power for the loading weight detection device is turned on, the arithmetic part 31 first determines whether initial setting data is stored in the storage part 32 (at step A1). At step A1, in the case where the initial setting data is not stored in the storage part 32, the arithmetic part 31 causes the initial setting screen 40 shown in FIG. 5A to be displayed in the touch panel 33 (at step A2), and receives an input of a value for the vehicle body weight $m_a$ of the cargo vehicle 10, and an input of a value for the initial setting cargo weight $m_{b0}$ to be loaded on the cargo bed 11 (at step A3). In the initial setting screen 40, there are provided a vehicle body weight input field 41 for receiving an input of a value for the vehicle body weight $m_a$ of the cargo vehicle 10, a cargo weight input field 42 for receiving an input of a value for the initial setting cargo weight $m_{b0}$ to be loaded on the cargo bed 11, and an initial setting pushbutton 43. The cargo weight $m_{b0}$ of the cargo 1 to be loaded on the cargo bed 11 should be a weight that can cause an oscillation in the up-down direction with a travel of the cargo vehicle 10.

The operator loads the cargo 1 having an initial setting cargo weight of $m_{b0}$ on the cargo bed 11, and on the initial setting screen 40, performs an input of a value for the vehicle body weight $m_a$ of the cargo vehicle 10 in the vehicle body weight input field 41, and an input of a value for the initial setting cargo weight $m_{b0}$ in the cargo weight input field 42. Then, with the cargo 1 of the initial setting cargo weight $m_{b0}$, which is known, being loaded, the operator causes the cargo vehicle 10 (having a known total weight of $m_0$ that is equal to the vehicle body weight $m_a$ plus the initial setting cargo weight $m_{b0}$) to travel, and during traveling of the cargo vehicle 10, operates the initial setting pushbutton 43 on the initial setting screen 40. When the cargo vehicle 10 is traveled, the tires continue to tread on the irregularities of the road surface, thereby a random external disturbance being transmitted to the vehicle body of the cargo vehicle 10 through the tires and the suspensions. In the case where the cargo bed 11 itself or an attachment, such as a crane mounted to the cargo bed 11, has a weight large enough to produce an oscillation of the cargo bed 11 in the up-down direction, thus eliminating the need for loading the cargo 1 on the cargo bed 11, only an input of a value for the vehicle body weight $m_a$ of the cargo vehicle 10 may be received at step A3, and while traveling the cargo vehicle 10 (having a known total weight of $m_0$ that is equal to the vehicle body weight $m_a$) with an empty load, the initial setting pushbutton 43 on the initial setting screen 40 may be operated.

Next, the arithmetic part 31 monitors the operation of the initial setting pushbutton 43 (at step A4), and when the initial setting pushbutton 43 is operated during traveling of the cargo vehicle 10, stores oscillation data in the up-down direction of the cargo bed 11 that is detected by the vibration detection part 20 in the storage part 32 as time series oscillation data for a prescribed period of time that has been previously set (at step A5).

Next, the arithmetic part 31 applies fast Fourier transformation to the time series oscillation data that has been stored in the storage part 32, identifying the vertical oscillation center-of-gravity-specific natural vibration frequency $V_{z0}$ as the natural vibration in a self-weight direction of the cargo bed 11 (the Z-axis direction) (at step A6). Then, the arithmetic part 31 stores the values for the vehicle body weight $m_a$ and the initial setting cargo weight $m_{b0}$ of the vehicle 10 an input of which have been received at step A3, and the vertical oscillation center-of-gravity-specific natural vibration frequency $V_{z0}$ that has been identified at step A6 in the storage part 32 as initial setting data (step A7), returning to step A1. The processing operations at steps A2 to A7 are performed as initial setting operations at the stage in which the loading weight detection device of the present embodiment has been installed on the cargo vehicle 10, and the initial setting data is generally provided to the user, being stored in the storage part 32.

In the case where, at step A1, the initial setting data is stored in the storage part 32, the arithmetic part 31 causes a measurement screen 50 shown in FIG. 5B, in which a measurement instruction pushbutton 51 is disposed, to be displayed on the touch panel 33 (at step A8), monitoring the operation of the measurement instruction pushbutton 51 (at step A9).

The driver travels the cargo vehicle 10 (having an unknown total weight of M that is equal to the vehicle body weight $m_a$ plus an unknown cargo weight of $m_b$) with the cargo 1, which is unknown about the cargo weight $m_b$, being loaded, and during traveling of the cargo vehicle 10, operates the measurement instruction pushbutton 51 on the measurement screen 50. When the cargo vehicle 10 is traveled, the tires continue to tread on the irregularities of the road surface, thereby a random external disturbance being transmitted to the vehicle body of the cargo vehicle 10 through the tires and the suspensions. When the measurement instruction pushbutton 51 is operated during traveling of the cargo vehicle 10, oscillation data in the up-down direction of the cargo bed 11 that is detected by the vibration detection part 20 is stored in the storage part 32 as time series oscillation data for a prescribed period of time that has been previously set (at step A10).

Next, the arithmetic part 31 applies fast Fourier transformation to the time series oscillation data that has been stored in the storage part 32, identifying the vertical oscillation center-of-gravity-specific natural vibration frequency $V_z$ as the natural vibration in a self-weight direction of the cargo bed 11 (the Z-axis direction) (at step A11). Then, the arithmetic part 31 makes an arithmetic operation, using the vertical oscillation center-of-gravity-specific natural vibration frequency $V_z$ that has been identified and the initial setting data, thereby calculating a value for the unknown total weight M (at step A12), and subtracts the value for the vehicle body weight $m_a$ from the value for the unknown total weight M that has been calculated, thereby calculating a value for the unknown cargo weight $m_b$ (at step A13), outputting the value for the unknown cargo weight $m_b$ that has been calculated, by making a display notification through the weight notification screen 60 shown in FIG. 5C on the touch panel 33, or a voice notification through the reporting part 34 (at step A14).

Next, the calculation operation to be made by the arithmetic part 31 for the unknown total weight M (at step A12) will be explained in detail.

The cargo vehicle 10, which is a mobile body, produces a natural vibration according to the total weight (strictly the total mass) of the cargo vehicle 10 during traveling with an external disturbance from the ground being applied thereto. Such natural vibrations can be divided into broad general categories of linear motion and rotary motion, and the natural vibration that is directly produced according to the total weight of the cargo vehicle 10 is a simple harmonic motion in a self-weight direction (the Z-axis direction). By applying the 3-D center-of-gravity location detection theory, which, in the Japanese Patent No. 4517107, has previously been proposed by the present applicant, to formulate a simple harmonic motion in the vertical direction in the cargo vehicle 10, the simple harmonic motion can be expressed by the following equation.

$$V_z = \frac{1}{2\pi}\sqrt{\frac{2k_0}{M}} \quad \text{[Math 1]}$$

In Math 1, the symbol M denotes the total weight that has been obtained by adding an unknown weight of $m_b$ of the cargo 1 to the vehicle body weight $m_a$ of the cargo vehicle 10; $V_z$ the vertical oscillation center-of-gravity-specific natural vibration frequency of the cargo vehicle 10 having a total weight of M; $k_0$ the elastic modulus (spring constant) of the tire or suspension as the virtual spring 2; and $\pi$ the circumference ratio.

By deforming Math 1, the total weight M can be expressed by the following equation:

$$M = \frac{k_0}{2V_z^2\pi^2} \quad \text{[Math 2]}$$

In Math 2, a value for the vertical oscillation center-of-gravity-specific natural vibration frequency $V_z$ can be calculated by applying fast Fourier transformation to the time series oscillation data, which is the oscillation data in a self-weight direction (the Z-axis direction) that is outputted from the acceleration sensor 21 and stored for a prescribed period of time. Therefore, if the elastic modulus $k_0$ of the virtual spring 2 is found, a value for the total weight "M" of the cargo vehicle 10 can be calculated using Math 2.

The elastic modulus "$k_0$" of the virtual spring 2 can be expressed by deforming Math 1 and using the known total weight "$m_0$" of the cargo vehicle 10 and the vertical oscillation center-of-gravity-specific natural vibration frequency "$V_{Z0}$" of the cargo vehicle 10, the total weight of which is "$m_0$", as the following equation.

$$k_0 = 2m_0 V_{Z0}^2 \pi^2 \quad \text{[Math 3]}$$

Then, substitution of Math 3 into Math 2 gives the following equation.

$$M = \frac{V_{z0}^2}{V_z^2} m_0 \quad \text{[Math 4]}$$

Here, the known total weight $m_0$ (the vehicle body weight $m_a$ plus the cargo weight $m_{b0}$) and the vertical oscillation center-of-gravity-specific natural vibration frequency $V_{z0}$ of the cargo vehicle 10, the total weight of which is $m_0$, are the initial setting data that has been stored in the storage part 32 by the initial setting. Therefore, during traveling of the cargo vehicle 10 that is loaded with the cargo 1 having an unknown cargo weight of $m_b$, the arithmetic part 31 determines the vertical oscillation center-of-gravity-specific natural vibration frequency $V_z$, and further, computes Math 4, whereby the arithmetic part 31 can calculate a value for the unknown total weight M (the vehicle body weight $m_a$ plus the unknown cargo weight $m_b$).

As described above, the first embodiment provides a loading weight detection device that detects the cargo weight $m_b$ of the cargo loaded on the cargo vehicle 10, including: a touch panel 33 functioning as a initial setting input means that receives an input of a value for the vehicle body weight $m_a$ of the cargo vehicle 10 and a value for the initial setting cargo weight $m_{b0}$ of the cargo 1; an oscillation detection part 20 that detects the oscillation of the cargo vehicle 10; an arithmetic part 31 functioning as a natural vibration identifying means that, on the basis of the oscillation data that has been detected by the oscillation detection part 20, identifies the natural vibration of the cargo vehicle 10 in a self-weight direction as a vertical oscillation center-of-gravity-specific natural vibration value; and a storage part 32 that stores the vertical oscillation center-of-gravity-specific natural vibration value that has been identified by the arithmetic part 31 with the cargo 1 having an initial setting cargo weight of $m_{b0}$ being loaded on the cargo vehicle 10, and the values for the vehicle body weight $m_a$ and the initial setting cargo weight $m_{b0}$ that have been received by the touch panel 33 as initial setting data, the arithmetic part 31 being configured so as to function as a total weight calculation means that, on the basis of the vertical oscillation center-of-gravity-specific natural vibration value that has been identified and the initial setting data, calculates a value for the total weight M of the cargo vehicle 10 that is loaded with the cargo 1.

With this configuration, there are provided advantages of being applicable to a great variety of cargo vehicles 10, and that, simply by inputting values for the vehicle body weight $m_a$ of the cargo vehicle 10 and the initial setting cargo weight $m_{b0}$ of the cargo 1 as the input variables, the loading weight can be accurately detected.

Further, in the first embodiment, the arithmetic part 31 is configured so as to identify the vertical oscillation center-of-gravity-specific natural vibration value by applying fast Fourier transformation to the time series oscillation data that has been detected by the oscillation detection part 20.

Further, in the first embodiment, the arithmetic part 31 is configured so as to identify the natural vibration in a self-weight direction of the cargo vehicle 10 as the vertical oscillation center-of-gravity-specific natural vibration frequency $V_z$, which is a vertical oscillation center-of-gravity-specific natural vibration value.

(Second Embodiment)

The loading weight detection device in a second embodiment is different from the first embodiment in that, with reference to FIG. 6, the former uses a vibration detection part 20a provided with an angular velocity sensor 23 in addition to the acceleration sensor 21, and an arithmetic part 31a in a data processing apparatus 30a detects the total weight M of the cargo vehicle (truck) 10 as a mobile body with the natural vibration around the vehicle axis 13, in other words, the Y-axis being taken into account.

With the angular velocity sensor 23, the sensitivity axis is adjusted such that the angle in the direction of rotation around the vehicle axis 13, in other words, the horizontal oscillation (oscillation) around the Y-axis is detected. The angular velocity sensor 23 is not particularly limited, and, for example, a crystal tuning fork type sensor or an oscillation type sensor may be used, and, as the acceleration sensor 21 and the angular velocity sensor 23, a three-axis (three dimensional) angular velocity sensor may be used.

The data processing apparatus 30a includes an arithmetic part 31a comprised of a microprocessor, and the like. In the storage part 32, a calculation program for deriving the total weight M is stored. The arithmetic part 31a stores outputs from the acceleration sensor 21 and the angular velocity sensor 23 in the storage part 32, respectively, for a certain period of time, and according to the calculation program stored in the storage part 32, performs arithmetic processing of the outputs from the acceleration sensor 21 and the angular velocity sensor 23 that have been stored in the storage part 32, thereby calculating a value for the total weight M of the cargo vehicle 10. Then, the arithmetic part 31a subtracts the value for the vehicle body weight $m_a$ from the value for the total weight M of the cargo vehicle 10 that has been calculated, thereby calculating a value for the cargo weight $m_b$ and outputting the value by making a display notification through the touch panel 33, or a voice notification through the reporting part 34.

Next, the calculation operation for the loading weight in the second embodiment will be explained in detail with reference to FIG. 7. The same processing operation as the loading weight calculation operation in the first embodiment will be provided with the same step number, a part of the explanation thereof being omitted.

Figure 7:
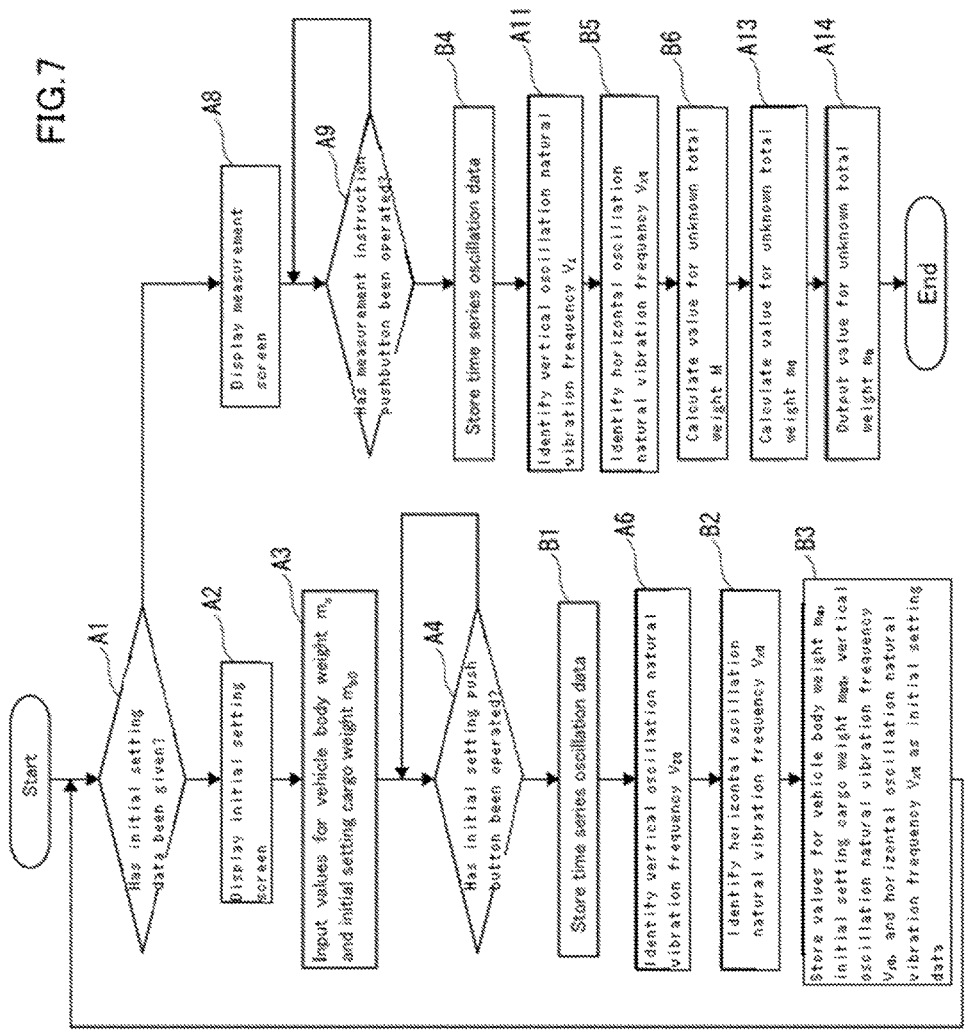
FIG. 7 is a flowchart for explaining the loading weight detecting operation in the loading weight detection device according to the second embodiment of the present invention.

With reference to FIG. 7, when, during traveling of the cargo vehicle 10, the initial setting pushbutton 43 is operated at step A4, the arithmetic part 31a stores the oscillation data in the up-down direction of the cargo bed 11 that is detected by the acceleration sensor 21 in the vibration detection part 20a, and the oscillation data around the Y-axis that is detected by the angular velocity sensor 23 in the storage part 32, respectively, as time series oscillation data for a prescribed period of time that has been previously set (at step B1). It is assumed that a value for the breadth b between the virtual springs 2 (the tires or suspensions) in the cargo vehicle 10 has been previously received by making an input thereof from an input means, such as the touch panel 33, and previously stored in the storage part 32 as initial setting data.

Next, the arithmetic part 31a applies fast Fourier transformation to the time series oscillation data in the up-down direction that has been stored in the storage part 32, identifying the vertical oscillation center-of-gravity-specific natural vibration frequency $V_{z0}$ of the cargo bed 11 (at step A6), and applies fast Fourier transformation to the time series oscillation data around the Y-axis that has been stored in the storage part 32, identifying the horizontal oscillation center-of-gravity-specific natural vibration frequency $V_{x0}$ as the natural vibration around the Y-axis (at step B2). Then, the arithmetic part 31a stores the values for the vehicle body weight $m_a$ and the initial setting cargo weight $m_{b0}$ of the vehicle 10 an input of which has been received at step A3; the vertical oscillation center-of-gravity-specific natural vibration frequency $V_{z0}$ that has been identified at step A6; and the horizontal oscillation center-of-gravity-specific natural vibration frequency $V_{x0}$ that has been identified at step B2 in the storage part 32 as initial setting data (step B3), returning to step A1. The processing operations at steps A2 to B3 are performed as initial setting operations at the stage in which the loading weight detection device of the present embodiment has been installed on the cargo vehicle 10, and the initial setting data is generally provided to the user, being stored in the storage part 32.

In addition, when the measurement instruction pushbutton 51 is operated at step A9 during traveling of the cargo vehicle 10 the total weight M of which is unknown, the arithmetic part 31a stores the oscillation data in the up-down direction of the cargo bed 11 that is detected by the acceleration sensor 21 in the vibration detection part 20a, and the oscillation data around the Y-axis that is detected by the angular velocity sensor 23 in the storage part 32, respectively, as time series oscillation data for a prescribed period of time that has been previously set (at step B4).

Next, the arithmetic part 31a applies fast Fourier transformation to the time series oscillation data in the up-down direction that has been stored in the storage part 32, identifying the vertical oscillation center-of-gravity-specific natural vibration frequency $V_z$ of the cargo bed 11 (at step A11), and applies fast Fourier transformation to the time series oscillation data around the Y-axis that has been stored in the storage part 32, identifying the horizontal oscillation center-of-gravity-specific natural vibration frequency $V_x$ as the natural vibration around the Y-axis (at step B5). Then, the arithmetic part 31a makes an arithmetic operation, using the vertical oscillation center-of-gravity-specific natural vibration frequency $V_z$ and the horizontal oscillation center-of-gravity-specific natural vibration frequency $V_x$ that have been identified and the initial setting data, thereby calculating a value for the unknown total weight M (at step B6). Hereinafter, in the same way as in the first embodiment, the arithmetic part 31a subtracts the value for the vehicle body weight $m_a$ from the value for the unknown total weight M that has been calculated, thereby calculating a value for the unknown cargo weight $m_b$ (at step A13), and outputting the value for the unknown cargo weight $m_b$ that has been calculated, by making a display notification through the weight notification screen 60 shown in FIG. 5C on the touch panel 33, or a voice notification through the reporting part 34 (step A14).

Figure 8B:
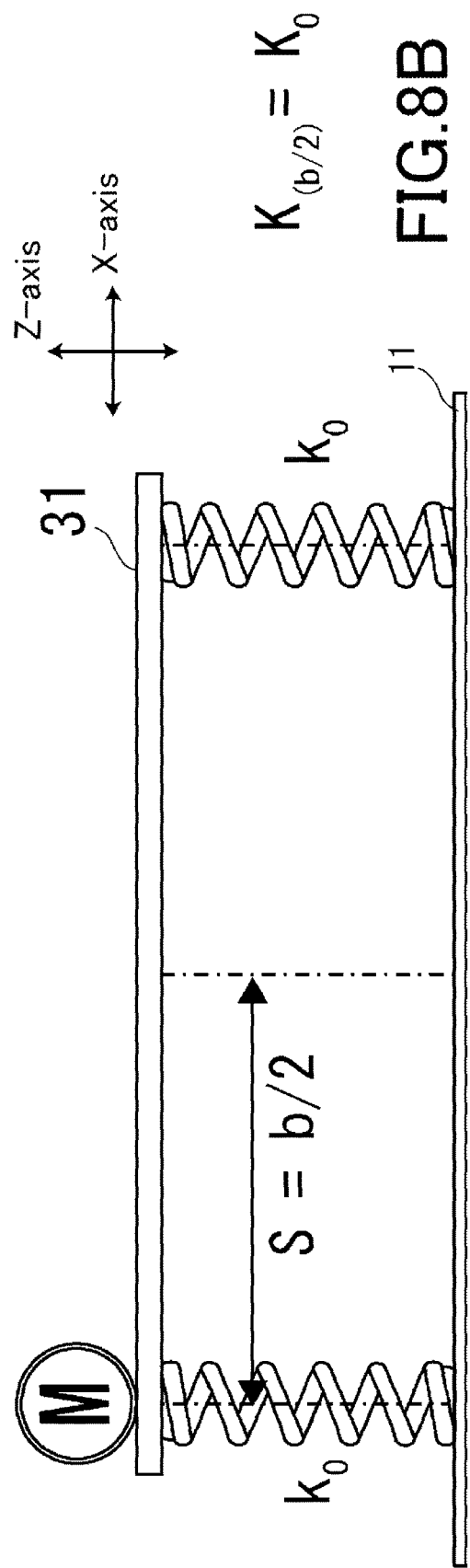
FIG. 8 is a explanatory drawing for explaining the change in spring constant that is dependent on the load position.

Next, the calculation operation to be made by the arithmetic part 31a for the unknown total weight M (at step B6) will be explained in detail with reference to FIG. 8.

Calculation of a value for the unknown total weight M in the first embodiment is based on the assumption that the right and left virtual springs supporting the cargo vehicle 10 have the same spring constant $k_0$. In other words, it is presupposed that the center-of-gravity location of the cargo vehicle 10 including the cargo 1 is located at the center in the right/left direction. However, in reality, the crews on the cargo vehicle 10 and the cargo 1 are arbitrarily disposed, and thus there is no guarantee that the center-of-gravity location is at the center in the right/left direction. For example, the overall value of spring constant of the cargo vehicle 10 including the cargo 1 varies depending upon the center-of-gravity location of the cargo vehicle 10 as shown in FIG. 8, and can be expressed by the following equation.

$$k_{(s)} = 2k_0\left(1 - \frac{s}{b}\right) \quad \text{[Math 5]}$$

In Math 5, the symbol $k_{(s)}$ denotes the overall value of spring constant of the cargo vehicle 10 including the cargo 1; b the breadth between the virtual springs 2 (the tires or suspensions) in the cargo vehicle 10; and s the displacement in the horizontal direction from the lateral center to the center-of-gravity location of the cargo vehicle 10.

In addition, by applying the 3-D center-of-gravity location detection theory, which, in the Japanese Patent No. 4517107, has previously been proposed by the present applicant, the relationship between the center-of-gravity location of the cargo vehicle 10 and the natural vibration around the Y-axis can be expressed by the following equation.

$$V_x = \frac{\sqrt{\frac{k_{(s)}}{2}b^2} - gl_x}{2\pi\sqrt{(l_x^2 + s_x^2)\cos\alpha_x}} \quad \text{[Math 6]}$$

In Math 6, the symbol $V_x$ denotes the horizontal oscillation center-of-gravity-specific natural vibration frequency around the Y-axis (around the vehicle axis 13) of the cargo vehicle 10; $l_x$ the height in the up-down direction from the vehicle axis 13 to the center-of-gravity location of the cargo vehicle 10; $s_x$ the displacement in the right-left direction from the vehicle axis 13 to the center-of-gravity location of the cargo vehicle 10; and $\alpha_x$ the static inclination angle of the cargo bed 11 (an angle formed between the horizontal plane and the neutral plane during oscillation, being equivalent to the phase).

By combining Math 6 with Math 5 and performing an expansion for the unknown total weight M, the following equation is given.

$$M = \frac{k_0\left(1 - \frac{s_x}{b}\right)b^2}{8\pi^2(l_x^2 + s_x^2)V_x^2\cos\alpha_x + 2gl_x} \quad \text{[Math 9a]}$$

Likewise, by performing an expansion of Math 6 with the known total weight $m_0$ and creating a form for determining the spring constant $k_0$, the following equation is given.

$$k_0 = m_0 \frac{8\pi^2(l_{x0}^2 + s_{x0}^2)V_{x0}^2\cos\alpha_{x0} + 2gl_{x0}}{\left(1 - \frac{s_{x0}}{b}\right)b^2} \quad \text{[Math 10a]}$$

Here, the symbol $V_{x0}$ denotes the horizontal oscillation center-of-gravity-specific natural vibration frequency of the cargo vehicle 10 having a known total weight of $m_0$; $l_{x0}$ the height in the vertical direction from the oscillation center axis to the center-of-gravity location of the cargo vehicle 10 having a known total weight of $m_0$; $s_{x0}$ the displacement in the horizontal direction from the oscillation center axis to the center-of-gravity location of the cargo vehicle 10 having a known total weight of $m_0$; and $\alpha_{x0}$ the static inclination angle (the oscillation center angle) of the cargo bed 11 in the cargo vehicle 10 having a known total weight of $m_0$, respectively.

Then, by substituting Math 10a into Math 9a, the following equation is given.

$$M = m_0 \frac{8\pi^2(l_{x0}^2 + s_{x0}^2)V_{x0}^2\cos\alpha_{x0} + 2gl_{x0}}{8\pi^2(l_x^2 + s_x^2)V_x^2\cos\alpha_x + 2gl_x} \cdot \frac{\left(1 - \frac{s_x}{b}\right)}{\left(1 - \frac{s_{x0}}{b}\right)} \quad \text{[Math 11a]}$$

In Math 11a, the value for the breadth b between the virtual springs 2 (the tires or suspensions) in the cargo vehicle 10 is previously stored in the storage part 32 as initial setting data, and the values for the known total weight $m_0$ (the vehicle body weight $m_a$ plus the initial setting cargo weight $m_{b0}$), the horizontal oscillation center-of-gravity-specific natural vibration frequency $V_{x0}$ of the cargo vehicle 10 having a total weight of $m_0$, and the vertical oscillation center-of-gravity-specific natural vibration frequency $V_{z0}$ of the cargo vehicle 10 having a total weight of $m_0$ are the initial setting data that has been stored in the storage part 32 by the initial setting. Then, using the horizontal oscillation center-of-gravity-specific natural vibration frequency $V_{x0}$ and the vertical oscillation center-of-gravity-specific natural vibration frequency $V_{z0}$, the height $l_{x0}$, the displacement $s_{x0}$ in the horizontal direction, and the static inclination angle $\alpha_{x0}$ are determined respectively, and the values for these are also stored as initial setting data. The value for the breadth b between the virtual springs 2 may be received by making an input thereof at the time of initial setting. In addition, the value for the vehicle body weight $m_a$ may be previously received by making an input thereof from an input means, such as the touch panel 33, and previously stored in the storage part 32 as initial setting data.

The static inclination angle $\alpha_{x0}$ can be determined by using the horizontal oscillation center-of-gravity-specific natural vibration frequency $V_{x0}$ and the vertical oscillation center-of-gravity-specific natural vibration frequency $V_{z0}$ to simultaneously solve Eq. 12 and Eq. 14 that are given in WO2011067939A1, which has been previously proposed by the applicant. This simultaneous equation includes a transcendental function, and thus cannot be analytically solved, however, if a technique of the applied mathematics that is well and widely known in general is used, the simultaneous equation can be solved as a numerical solution, and by substituting the value for the horizontal oscillation center-of-gravity-specific natural vibration frequency $V_{x0}$ into v, and the value for the vertical oscillation center-of-gravity-specific natural vibration frequency $V_{z0}$ into v', respectively, and determining the α as a solution, a value for the static inclination angle $α_{x0}$ can be calculated.

The static inclination angle $α_{x0}$ may be measured using a level prior to starting of traveling, or can be measured by installing a high-performance gyroscope for ships and aircrafts, or the like.

The height $l_{x0}$ and the displacement $s_{x0}$ in the horizontal direction can be determined by using the horizontal oscillation center-of-gravity-specific natural vibration frequency $V_{x0}$, the vertical oscillation center-of-gravity-specific natural vibration frequency $V_{z0}$, and the static inclination angle $α_{x0}$, and simultaneously solving Math 15 and Math 16 given in Japanese Patent No. 4517107 that has been previously proposed by the present applicant. This simultaneous equation includes a transcendental function, and thus cannot be analytically solved, however, if a technique of the applied mathematics that is well and widely known in general is used, the simultaneous equation can be solved as a numerical solution, and by substituting the value for the horizontal oscillation center-of-gravity-specific natural vibration frequency $V_{x0}$ into v, the value for the vertical oscillation center-of-gravity-specific natural vibration frequency $V_{z0}$ into v', and the value for the static inclination angle $α_{x0}$ into α, respectively, and determining the l and s as solutions, a value for the height $l_{x0}$ and a value for the displacement $s_{x0}$ in the horizontal direction are calculated, respectively.

Next, during traveling of the cargo vehicle 10 that is loaded with the cargo 1 having an unknown cargo weight of $m_b$, the arithmetic part 31 determines the vertical oscillation center-of-gravity-specific natural vibration frequency $V_z$ and the horizontal oscillation center-of-gravity-specific natural vibration frequency $V_x$, and further, using the values for the vertical oscillation center-of-gravity-specific natural vibration frequency $V_z$ and the horizontal oscillation center-of-gravity-specific natural vibration frequency $V_x$, and by the same method as that by which the height $l_{x0}$, the displacement $s_{x0}$ in the horizontal direction, and the static inclination angle $α_{x0}$ have been determined, determines the height $l_x$, the displacement $s_x$ in the horizontal direction, and the static inclination angle αx, respectively.

Then, the arithmetic part 31 substitutes the initial setting data (the values for the horizontal oscillation center-of-gravity-specific natural vibration frequency $V_{x0}$, the vertical oscillation center-of-gravity-specific natural vibration frequency $V_{z0}$, the height $l_{x0}$, the displacement $s_{x0}$ in the horizontal direction, and the static inclination angle $α_{x0}$), the values for the vertical oscillation center-of-gravity-specific natural vibration frequency $V_z$, the horizontal oscillation center-of-gravity-specific natural vibration frequency $V_x$, the height $l_x$, the displacement $s_x$ in the horizontal direction, and the static inclination angle $α_x$ into Math 11a. Thereby, in Math 11a, the unknown number is now only the unknown total weight M, and by computing Math 11a, a value for the unknown total weight M (the vehicle body weight $m_a$ plus the cargo weight $m_b$) can be calculated. Then, the arithmetic part 31a subtracts the value for the vehicle body weight $m_a$ from the value for the total weight M of the cargo vehicle 10 that has been calculated, thereby calculating a value for the cargo weight $m_b$ and outputting the value by making a display notification through the touch panel 33, or a voice notification through the reporting part 34.

Here, in Math 11a, assuming the values for the $s_{x0}$ and $s_x$ are zero, in other words, the center-of-gravity is located at the center in the right-left direction, Math 11a is reduced to Math 4. In other words, Math 4 is what is involved in the theoretical system of Math 11a. Therefore, Math 11a can be theoretically properly used to determine the weight wherever the center-of-gravity may be located.

As described above, the second embodiment provides a loading weight detection device that detects the cargo weight $m_b$ of the cargo 1 that is loaded on the cargo vehicle 10, including: a touch panel 33 functioning as a initial setting input means that receives an input of values for the vehicle body weight $m_a$ of the cargo vehicle 10, the breadth b between the virtual springs 2 in the cargo vehicle 10, and the initial setting cargo weight $m_{b0}$ of the cargo 1; an oscillation detection part 20a that detects the oscillation of the cargo vehicle 10; an arithmetic part 31a functioning as a natural vibration identifying means that, on the basis of the oscillation data that has been detected by the oscillation detection part 20a, identifies the natural vibration in a self-weight direction of the cargo vehicle 10 as a vertical oscillation center-of-gravity-specific natural vibration value, and identifies the natural vibration around the vehicle axis of the cargo vehicle 10 as a horizontal oscillation center-of-gravity-specific natural vibration value, a storage part 32a that stores the vertical oscillation center-of-gravity-specific natural vibration value and the horizontal oscillation center-of-gravity-specific natural vibration value that have been identified by the arithmetic part 31a with the cargo 1 having an initial setting cargo weight of $m_{b0}$ being loaded on the cargo vehicle 10, and the values for the vehicle body weight $m_a$, the breadth b between the virtual springs 2, and the initial setting cargo weight $m_{b0}$ that have been received by the touch panel 33 as initial setting data, the arithmetic part 31a being configured so as to function as a total weight calculation means that, on the basis of the vertical oscillation center-of-gravity-specific natural vibration value and the horizontal oscillation center-of-gravity-specific natural vibration value that have been identified and the initial setting data, calculates a value for the total weight M of the cargo vehicle 10 that is loaded with the cargo 1.

With this configuration, there are provided advantages of being applicable to a great variety of cargo vehicles 10, and that, simply by inputting values for the vehicle body weight $m_a$ of the cargo vehicle 10 and the initial setting cargo weight $m_{b0}$ of the cargo 1 as the input variables, the loading weight can be accurately detected.

Further, in the second embodiment, the arithmetic part 31a is configured so as to identify the vertical oscillation center-of-gravity-specific natural vibration value and the horizontal oscillation center-of-gravity-specific natural vibration value by applying fast Fourier transformation to the time series oscillation data that has been detected by the oscillation detection part 20a.

Further, in the second embodiment, the arithmetic part 31a is configured so as to identify the natural vibration in a self-weight direction of the cargo vehicle 10 as the vertical oscillation center-of-gravity-specific natural vibration frequency $V_z$, which is a vertical oscillation center-of-gravity-specific natural vibration value, and the natural vibration around the vehicle axis of the cargo vehicle 10 as the horizontal oscillation center-of-gravity-specific natural vibration frequency $V_x$, which is a horizontal oscillation center-of-gravity-specific natural vibration value.

(Third Embodiment)

The loading weight detection device of a third embodiment is different from that of the first embodiment in initial setting operation, and with the former, a value for the vehicle body weight $m_a$ can be calculated, thus eliminating the need for inputting a value for the vehicle body weight $m_a$ as initial setting data. Therefore, even in the case where the value for the vehicle body weight $m_a$ of a cargo vehicle 10 is unknown, or is too large to be measured, the loading weight can be accurately detected.

Hereinafter, the loading weight detecting operation in the third embodiment will be explained in detail with reference to FIG. 9 and FIG. 10.

Figure 9:
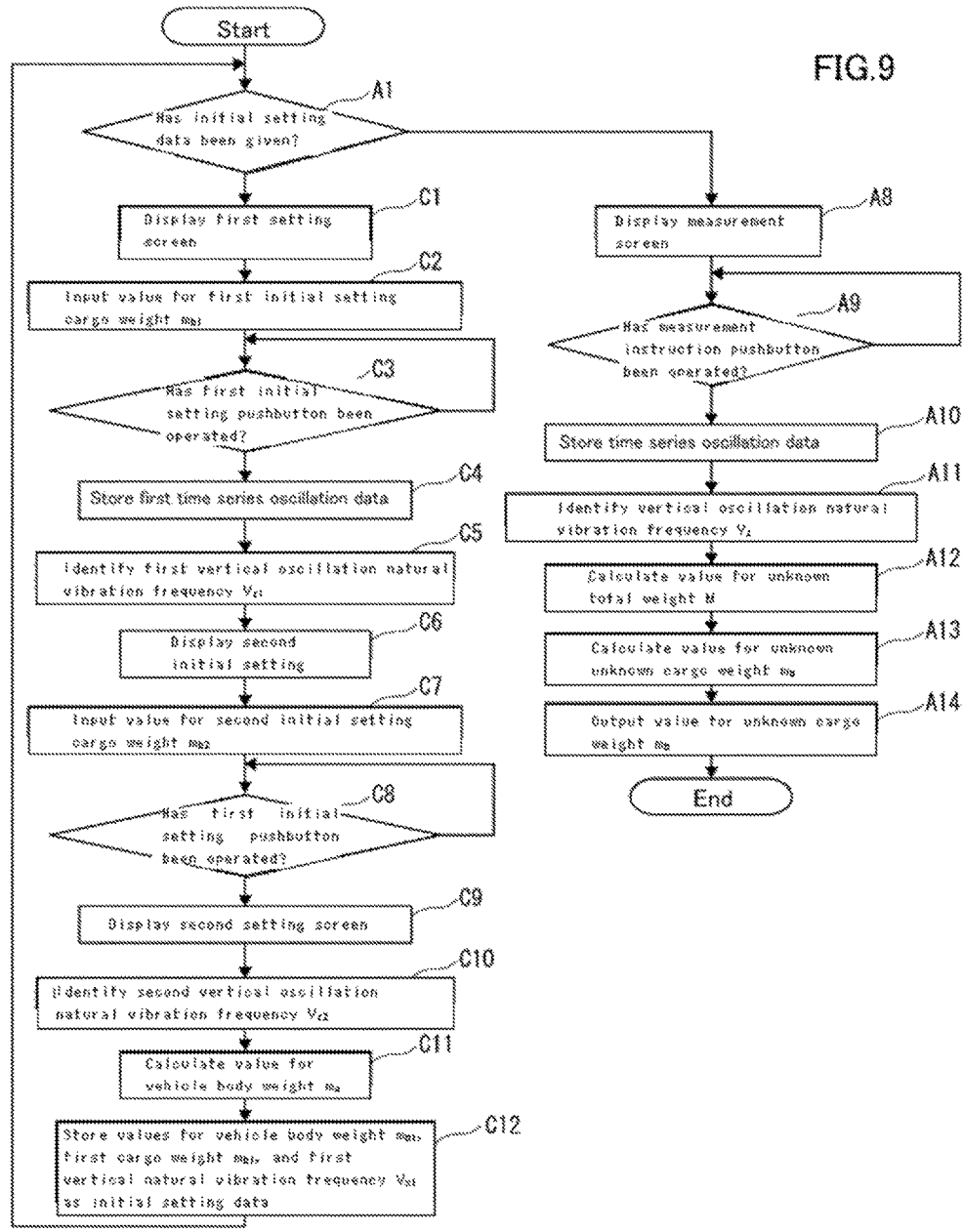
FIG. 9 is a flowchart for explaining the loading weight detecting operation in the loading weight detection device according to a third embodiment of the present invention.

With reference to FIG. 9, for example, being interlocked with the start of an engine of the cargo vehicle 10, the power for the loading weight detection device is turned on, the arithmetic part 31 first determines whether or not the initial setting data is stored in the storage part 32 (at step A1). In the case where, at step A1, the initial setting data is not stored in the storage part 32, the arithmetic part 31 causes a first initial setting screen 70 shown in FIG. 10A to be displayed on the touch panel 33 (step C1), and receives an input of a value for the first initial setting cargo weight $m_{b1}$ to be placed on the cargo bed 11 of the cargo vehicle 10 (at step C2). In the first initial setting screen 70, there are provided a cargo weight input field 71 that receives an input of a value for the first initial setting cargo weight $m_{b1}$ to be placed on the cargo bed 11, and a first initial setting pushbutton 72. The first cargo weight $m_{b1}$ of the cargo 1 to be loaded on the cargo bed 11 should be a weight that will cause an oscillation in the up-down direction of the cargo bed 11 with a travel of the cargo vehicle 10.

The operator loads the cargo 1 having a first initial setting cargo weight of $m_{b1}$ on the cargo bed 11, and on the first initial setting screen 70, inputs a value for the first initial setting cargo weight $m_{b1}$ to the cargo weight input field 71. Then, with the cargo 1 having a first initial setting cargo weight of $m_{b1}$, which is known, having been loaded, the operator travels the cargo vehicle 10, and during traveling of the cargo vehicle 10, operates the first initial setting pushbutton 72 on the first initial setting screen 70. When the cargo vehicle 10 is traveled, the tires continue to tread on the irregularities of the road surface, thereby a random external disturbance being transmitted to the vehicle body of the cargo vehicle 10 through the tires and the suspensions.

Next, the arithmetic part 31 monitors the operation of the first initial setting pushbutton 72 (at step C3), and when the first initial setting pushbutton 72 is operated during traveling of the cargo vehicle 10, stores oscillation data in the up-down direction of the cargo bed 11 that is detected by the vibration detection part 20 in the storage part 32 as time series oscillation data for a prescribed period of time that has been previously set (at step C4).

Next, the arithmetic part 31 applies fast Fourier transformation to the time series oscillation data that has been stored in the storage part 32, identifying the first vertical oscillation center-of-gravity-specific natural vibration frequency $V_{z1}$ as the natural vibration in a self-weight direction of the cargo bed 11 (the Z-axis direction) (at step C5).

Next, the arithmetic part 31 causes a second initial setting screen 80 shown in FIG. 10B to be displayed on the touch panel 33 (at step C6), and receives an input of a value for the second initial setting cargo weight $m_{b2}$ to be placed on the cargo bed 11 of the cargo vehicle 10 (at step C7). On the second initial setting screen 80, there are provided a cargo weight input field 81, which receives an input of a value for the second initial setting cargo weight mb2 to be placed on the cargo bed 11, and a second initial setting pushbutton 82. The first cargo weight mb2 of the cargo 1 to be loaded on the cargo bed 11 should be a weight that will cause an oscillation in the up-down direction of the cargo bed 11 with a travel of the cargo vehicle 10. In the case where the cargo bed 11 itself or an attachment, such as a crane mounted to the cargo bed 11, has a weight large enough to produce an oscillation of the cargo bed 11 in the up-down direction, thus eliminating the need for loading the cargo 1 on the cargo bed 11, either of the values for the first initial setting cargo weight $m_{b1}$ and the second initial setting cargo weight $m_{b2}$ may be inputted as "0 kg".

The operator loads the cargo 1 having a second initial setting cargo weight of $m_{b2}$ on the cargo bed 11, and on the second initial setting screen 80, inputs a value for the second initial setting cargo weight $m_{b2}$ to the cargo weight input field 81. Then, with the cargo 1 having an initial setting cargo weight of $m_{b2}$, which is known, having been loaded, the operator travels the cargo vehicle 10, and during traveling of the cargo vehicle 10, operates the second initial setting pushbutton 82 on the second initial setting screen 80. When the cargo vehicle 10 is traveled, the tires continue to tread on the irregularities of the road surface, thereby a random external disturbance being transmitted to the vehicle body of the cargo vehicle 10 through the tires and the suspensions.

Next, the arithmetic part 31 monitors the operation of the second initial setting pushbutton 82 (at step C8), and when the second initial setting pushbutton 82 is operated during traveling of the cargo vehicle 10, stores oscillation data in the up-down direction of the cargo bed 11 that is detected by the vibration detection part 20 in the storage part 32 as time series oscillation data for a prescribed period of time that has been previously set (at step C9).

Next, the arithmetic part 31 applies fast Fourier transformation to the time series oscillation data stored in the storage part 32, identifying the second vertical oscillation center-of-gravity-specific natural vibration frequency $V_{z2}$ as the natural vibration in a self-weight direction of the cargo bed 11 (the Z-axis direction) (at step C10).

Next, the arithmetic part 31 calculates a value for the vehicle body weight $m_a$ (at step C11). In other words, Math 4 can be expressed by the following equation Math 14, and by substituting, thereinto, the values for the first initial setting cargo weight $m_{b1}$ and the second initial setting cargo weight $m_{b2}$, and the values for the first vertical oscillation center-of-gravity-specific natural vibration frequency $V_{z1}$ and the second vertical oscillation center-of-gravity-specific natural vibration frequency $V_{z2}$, a value for the vehicle body weight $m_a$ can be calculated.

$$(m_a + m_{b1}) = \frac{V_{z2}^2}{V_{z1}^2}(m_a + m_{b2}) \qquad \text{[Math 14]}$$

Then, the arithmetic part 31 stores the value for the vehicle body weight $m_a$ of the vehicle 10 that has been calculated at step C11; the value for the first initial setting cargo weight $m_{b1}$ an input of which has been received at step C2; and the value for the first vertical oscillation center-of-gravity-specific natural vibration frequency $V_{z1}$ that has been identified at step C5 as initial setting data in the storage part 32 (at step C12), returning to step A1. The processing operations at steps C2 to C12 are performed as initial setting operations at the stage in which the loading weight detection device of the present embodiment has been installed on the cargo vehicle 10, and the initial setting data is generally provided to the user, being stored in the storage part 32. At step C12, the value for the second initial setting cargo weight $m_{b2}$ an input of which has been received at step C7 and the second vertical oscillation center-of-gravity-specific natural vibration frequency $V_{z2}$ that has been identified at step C10 may be stored in the storage part 32 as initial setting data.

As described above, the third embodiment provides a loading weight detection device that detects the cargo weight $m_b$ of the cargo 1 that is loaded on the cargo vehicle 10, including: a touch panel 33 functioning as a initial setting input means that receives an input of values for the first initial setting cargo weight $m_{b1}$ and the second initial setting cargo weight $m_{b2}$ of the cargo 1; an oscillation detection part 20 that detects the oscillation of the cargo vehicle 10; and an arithmetic part 31 functioning as a natural vibration identifying means that, on the basis of the oscillation data that has been detected by the oscillation detection part 20, identifies the natural vibration of the cargo vehicle 10 in a self-weight direction as a vertical oscillation center-of-gravity-specific natural vibration value, and the arithmetic part 31 functions as a vehicle body weight calculation means that calculates a value for the vehicle body weight $m_a$ of the cargo vehicle 10 on the basis of the values for the first initial setting cargo weight $m_{b1}$ and the second initial setting cargo weight $m_{b2}$ that have been received by the touch panel 33, the first vertical oscillation center-of-gravity-specific natural vibration value that has been identified with the cargo 1 having a first initial setting cargo weight of $m_{b1}$ being loaded on the cargo vehicle 10, and the second vertical oscillation center-of-gravity-specific natural vibration value that has been identified with the cargo 1 having a second initial setting cargo weight of $m_{b2}$ being loaded on the cargo vehicle 10, and stores the value for the vehicle body weight $m_a$ that has been calculated, the value for the first initial setting cargo weight $m_{b1}$, and the first vertical oscillation center-of-gravity-specific natural vibration value in the storage part 32 as initial setting data. In addition, the arithmetic part 31 is configured so as to function as a total weight calculation means that, on the basis of the vertical oscillation center-of-gravity-specific natural vibration value that has been identified and the initial setting data, calculates a value for the total weight M of the cargo vehicle 10 that is loaded with the cargo 1.

This configuration provides an advantage that, even in the case where the value for the vehicle body weight $m_a$ of a cargo vehicle 10 is unknown, or is too large to be measured, the loading weight can be accurately detected.

The third embodiment is configured such that, on the basis of Math 4, which has been used in the first embodiment for calculation of a value for the unknown total weight M, a value for the vehicle body weight $m_a$ is calculated, however, on the basis of Math 9a to Math 11a, which have been used in the second embodiment for calculation of a value for the unknown total weight M, a value for the vehicle body weight of $m_a$ may be calculated. In this case, the arithmetic part 31a is caused to identify the first vertical oscillation center-of-gravity-specific natural vibration frequency $V_{z1}$ and the first horizontal oscillation center-of-gravity-specific natural vibration frequency $V_{x1}$ with the cargo 1 having a first initial setting cargo weight of $m_{b1}$ being loaded on the cargo bed 11, and to identify the second vertical oscillation center-of-gravity-specific natural vibration frequency $V_{z2}$ and the second horizontal oscillation center-of-gravity-specific natural vibration frequency $V_{x2}$ with the cargo 1 having a second initial setting cargo weight of $m_{b2}$ being loaded on the cargo bed 11. Then, the arithmetic part 31a is caused to calculate a value for the vehicle body weight $m_a$. In other words, Math 11a can be expressed by the following expression Math 15, and a more accurate value for the vehicle body weight $m_a$ can be calculated.

$$(m_a + m_{b1}) = (m_a + m_{b2}) \frac{8\pi^2(l_{x2}^2 + s_{x2}^2)V_{x2}^2\cos\alpha_{x2} + 2gl_{x2}}{8\pi^2(l_{x1}^2 + s_{x1}^2)V_{x1}^2\cos\alpha_{x1} + 2gl_{x1}} \cdot \frac{\left(1 - \frac{s_{x1}}{b}\right)}{\left(1 - \frac{s_{x2}}{b}\right)} \quad \text{[Math 15]}$$

Figure 5A:
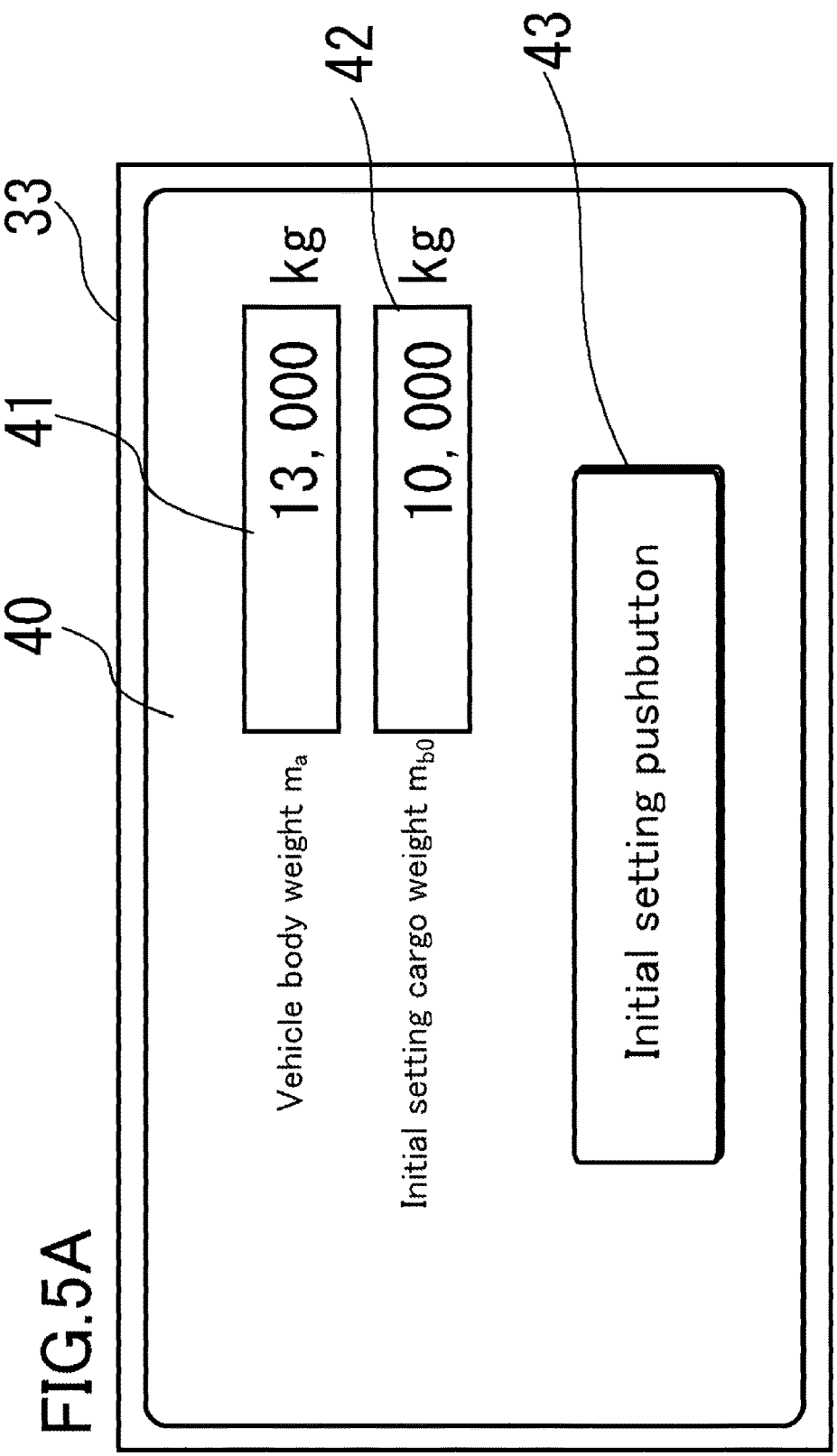
FIG. 5 is a figure illustrating an example of display screen that is displayed in a touch panel shown in FIG. 2.

Next, a demonstration test of the first embodiment was conducted using a 12-ton vehicle as the cargo vehicle 10. The vehicle body weight $m_a$ of this experimental vehicle was 13,000 kg, and a weight of 10,000 kg, which was statically measured with a platform weighing machine, was loaded on the cargo bed 11 as the cargo 1. Thereby, a value of 23,000 kg was obtained for the known total weight $m_0$. Then, as an initial setting operation, as shown in FIG. 5A, on the initial setting screen 40 that was displayed on the touch panel 33, the value of 13,000 kg for the vehicle body weight $m_a$ was inputted to the vehicle body weight input field 41, and the value of 10,000 kg for the initial setting cargo weight $m_{b0}$ was inputted to the cargo weight input field 42.

Next, while the experimental vehicle was traveled on a public road along a stream of cars, the measurement instruction pushbutton 51 on the measurement screen 50 was operated to identify the vertical oscillation center-of-gravity-specific natural vibration frequency $V_{z0}$. FIG. 11A gives time series oscillation data in the up-down direction that was stored in the storage part 32 in the initial setting operation, while FIG. 11B gives a graph that was obtained by applying fast Fourier transformation to the time series oscillation data in the up-down direction that was stored in the storage part 32 in the initial setting operation. In FIG. 11B, the frequency with a maximum amplitude was identified as the vertical oscillation center-of-gravity-specific natural vibration frequency $V_{z0}$, and a value of 2.83203 Hz was obtained for the vertical oscillation center-of-gravity-specific natural vibration frequency $V_{z0}$. Thereby, as the initial setting data, the value of 13,000 kg for the vehicle body weight $m_a$, the value of 10,000 kg for the initial setting cargo weight $m_{b0}$, and the value of 2.83203 Hz for the vertical oscillation center-of-gravity-specific natural vibration frequency $V_{z0}$ were stored.

Next, the cargo 1 that had been loaded on the cargo bed 11 was replaced with a weight of 5,000 kg, which was statically measured with a platform weighing machine, and, while the experimental vehicle was traveled on a public road along a stream of cars, the measurement instruction pushbutton 51 on the measurement screen 50 was operated to identify the vertical oscillation center-of-gravity-specific natural vibration frequency $V_z$. FIG. 11C gives time series oscillation data in the up-down direction that was stored in the storage part 32 in the weight measuring operation, while FIG. 11D gives a graph that was obtained by applying fast Fourier transformation to the time series oscillation data in the up-down direction that was stored in the storage part 32 in the weight measuring operation. In FIG. 11D, the frequency with a maximum amplitude was identified as the vertical oscillation center-of-gravity-specific natural vibration frequency $V_{z0}$, and a value of 3.1250 Hz was obtained for the vertical oscillation center-of-gravity-specific natural vibration frequency $V_z$. Then, by substituting the value that was obtained for the vertical oscillation center-of-gravity-specific natural vibration frequency $V_z$ and the initial setting data into Math 4, a value of 18, 889.6 kg was calculated for the unknown vehicle body weight M, and by subtracting the value for the vehicle body weight $m_a$ from this value, a value of 5,889.6 kg was obtained for the unknown cargo weight mb with an error of more than 10% having been produced.

As a great factor of this error, it is considered that the center-of-gravity location was exactly not at the lateral center.

Then, as in the first embodiment, a demonstration test of the second embodiment was conducted using a 12-ton vehicle as the cargo vehicle 10. The vehicle body weight $m_a$ of this experimental vehicle was 13,000 kg, and a weight of 10,000 kg, which was statically measured with a platform weighing machine, was loaded on the cargo bed 11 as the cargo 1. Thereby, a value of 23,000 kg was obtained for the known total weight $m_0$. In addition, the breadth b between the virtual springs 2 (the tires or the suspensions) in the cargo vehicle 10 was 1.05 m. Then, as an initial setting operation, as shown in FIG. 5A, on the initial setting screen 40 that was displayed on the touch panel 33, a value of 13,000 kg for the vehicle body weight $m_a$ was inputted to the vehicle body weight input field 41, and a value of 10,000 kg for the initial setting cargo weight $m_{b0}$ was inputted to the cargo weight input field 42.

Figure 12A:
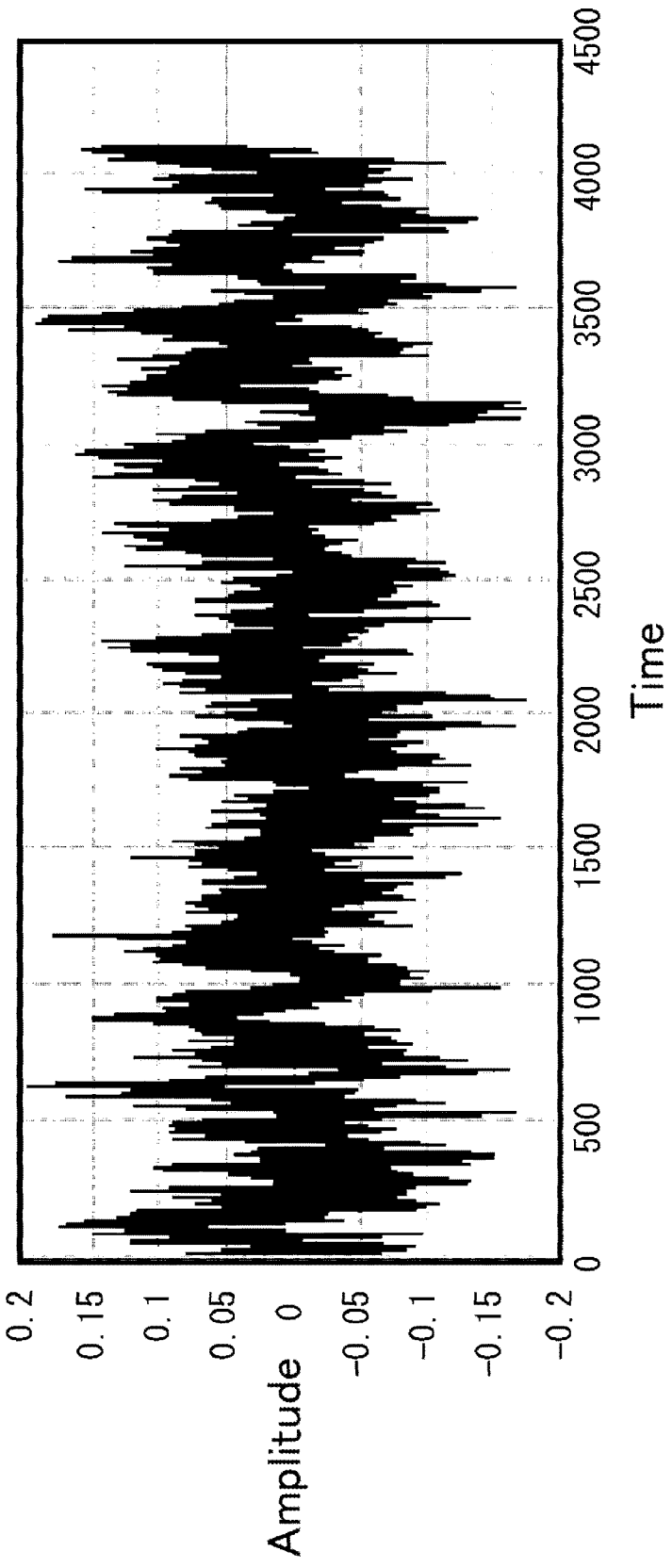
FIG. 12 is a graph showing an example of time series oscillation data around the Y-axis that has been obtained in a demonstration test of the loading weight detection device according to the second embodiment of the present invention.

Next, while the experimental vehicle was traveled on a public road along a stream of cars, the measurement instruction pushbutton 51 on the measurement screen 50 was operated to identify the horizontal oscillation center-of-gravity-specific natural vibration frequency $V_{x0}$ in addition to the vertical oscillation center-of-gravity-specific natural vibration frequency $V_{z0}$ in a self-weight direction (the Z-axis direction). FIG. 12A gives time series oscillation data around the Y-axis that was stored in the storage part 32 in the initial setting operation, while FIG. 12B gives a graph that was obtained by applying fast Fourier transformation to the time series oscillation data around the Y-axis that was stored in the storage part 32 in the initial setting operation. In FIG. 12B, the frequency with a maximum amplitude was identified as the horizontal oscillation center-of-gravity-specific natural vibration frequency $V_{x0}$, and a value of 1.172 Hz was obtained for the horizontal oscillation center-of-gravity-specific natural vibration frequency $V_{x0}$. Then, with the value for the horizontal oscillation center-of-gravity-specific natural vibration frequency $V_{x0}$ and the value for the vertical oscillation center-of-gravity-specific natural vibration frequency $V_{z0}$, there were given a value of 1.18 m for the height $l_{x0}$, a value of 0.077 m for the displacement in the horizontal direction $s_{x0}$, and a value of 0.01 for the static inclination angle $\alpha_{x0}$. Thereby, as the initial setting data, the value of 1.05 m for the breadth b between the virtual springs 2, the value of 13,000 kg for the vehicle body weight $m_a$, the value of 10,000 kg for the initial setting cargo weight $m_{b0}$, the value of 0.83203 Hz for the vertical oscillation center-of-gravity-specific natural vibration frequency $V_{z0}$, the value of 1.172 Hz for the horizontal oscillation center-of-gravity-specific natural vibration frequency $V_{x0}$, the value of 1.18 m for the height $l_{x0}$, the value of 0.077 m for the displacement $s_{x0}$ in the horizontal direction, and the value of 0.01 for the static inclination angle $\alpha_{x0}$ were stored in the storage part 32.

Figure 12C:
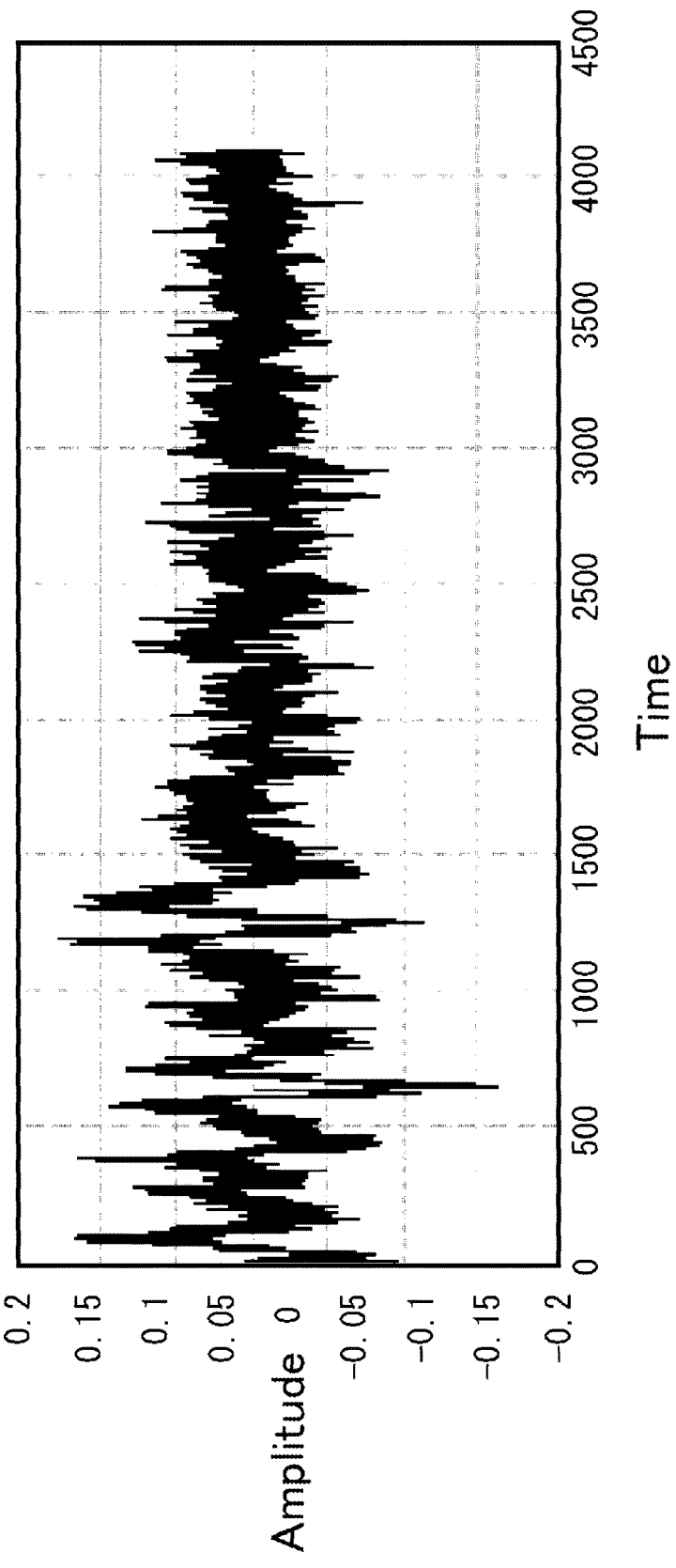
Figure 12D:
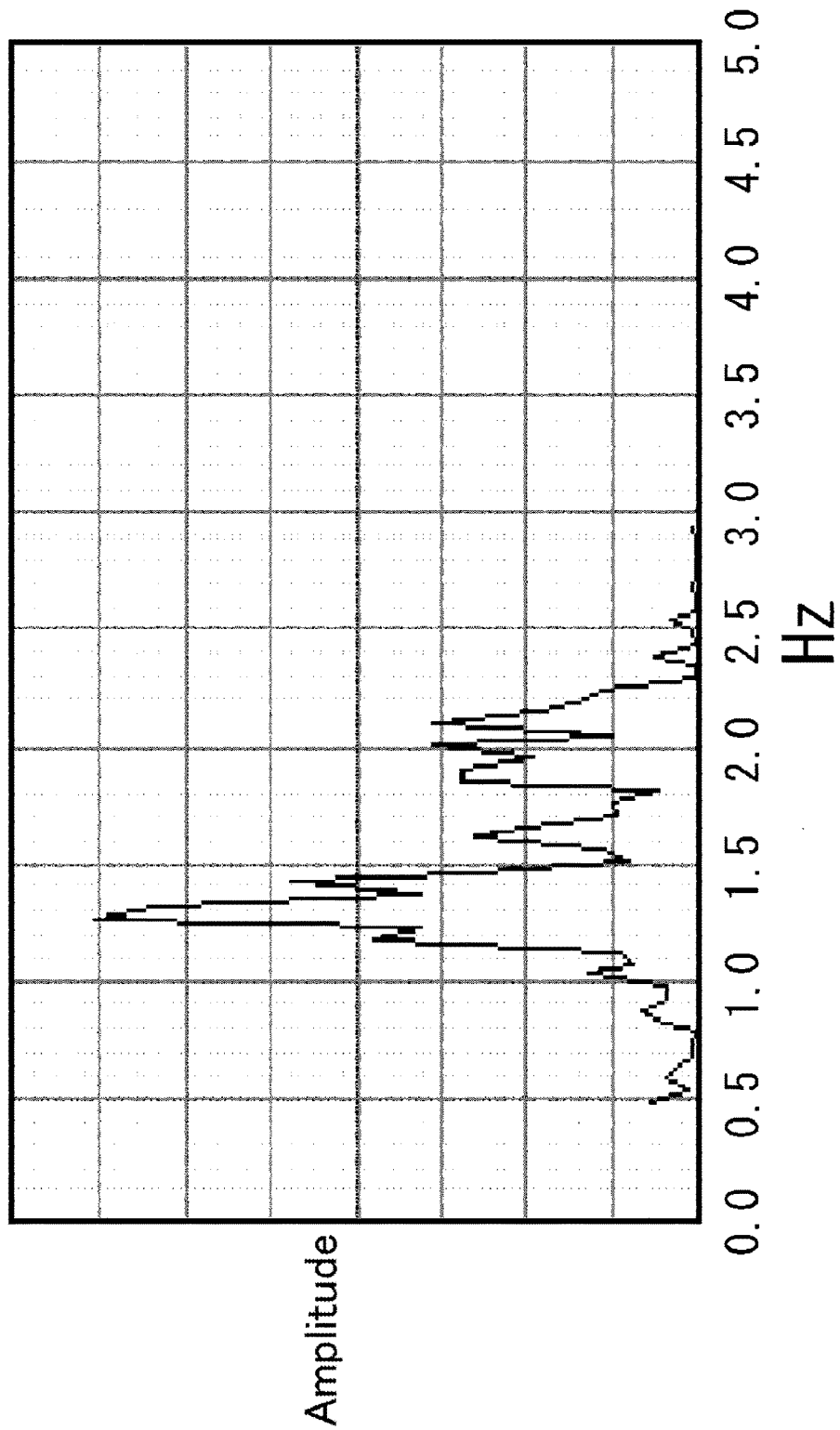

Next, the cargo 1 that had been loaded on the cargo bed 11 was replaced with a weight of 5,000 kg, which was statically measured with a platform weighing machine, and, while the experimental vehicle was traveled on a public road along a stream of cars, the measurement instruction pushbutton 51 on the measurement screen 50 was operated to identify the horizontal oscillation center-of-gravity-specific natural vibration frequency $V_x$ in addition to the vertical oscillation center-of-gravity-specific natural vibration frequency $V_z$ in a self-weight direction (the Z-axis direction). FIG. 12C gives time series oscillation data around the Y-axis that was stored in the storage part 32 in the weight measuring operation, while FIG. 12D gives a graph that was obtained by applying fast Fourier transformation to the time series oscillation data around the Y-axis that was stored in the storage part 32 in the weight measuring operation. In FIG. 12D, the frequency with a maximum amplitude was identified as the horizontal oscillation center-of-gravity-specific natural vibration frequency $V_x$, and a value of 1.270 Hz was obtained for the horizontal oscillation center-of-gravity-specific natural vibration frequency V. Then, with the value for the horizontal oscillation center-of-gravity-specific natural vibration frequency $V_x$ and the value for the vertical oscillation center-of-gravity-specific natural vibration frequency $V_z$, there were given a value of 1.21 m for the height $l_x$, a value of 0.096 m for the displacement in the horizontal direction $s_x$, and a value of 0.01 for the static inclination angle $\alpha_x$. By substituting the values for the vertical oscillation center-of-gravity-specific natural vibration frequency $V_z$, the horizontal oscillation center-of-gravity-specific natural vibration frequency $V_x$, the height $l_x$, the displacement $s_x$ in the horizontal direction, and the static inclination angle $\alpha_x$ that were obtained, and the initial setting data into Math 11a, a value of 18,650 kg for the unknown vehicle body weight M was calculated, and by subtracting the value for the vehicle body weight $m_a$ from this value, a value of 5,650 kg was obtained for the unknown cargo weight $m_b$. It can be seen that, in comparison with the first embodiment, the error was improved. In the experiment, the weight placed as the initial setting cargo weight $m_{b0}$ was 10,000 kg, while the weight placed as the unknown cargo weight $m_b$ was 5,000 kg. Considering from such situation, with the former, the weight concentrates on a lower location, and thus an expression of height $l_{x0}$<height $l_x$ is reasonably provided. In addition, for both, the loading condition was such that the weight was laid on the cargo bed in a uniform manner from right to left. Therefore, it is reasonable that the displacement in the horizontal direction $s_{x0}$, the static inclination angle $\alpha_{x0}$, the displacement in the horizontal direction $s_x$, and the static inclination angle $\alpha_x$ were given as extremely small values.

In the present embodiment, in identifying the vertical oscillation center-of-gravity-specific natural vibration frequency and the horizontal oscillation center-of-gravity-specific natural vibration frequency, fast Fourier transformation is used, thereby the limit of the minimal frequency unit producing an error. In the above demonstration test, the sampling interval was 0.005 sec. In this case, the minimal frequency unit at the time of fast Fourier transformation is 0.0049 Hz, and it is impossible to identify the natural frequency that is lower than this. Assuming that the value for the horizontal oscillation center-of-gravity-specific natural vibration frequency $V_x$ had an error of half the value of the minimal frequency unit, a value of 1.270 plus (0.0049/2) Hz is given for the horizontal oscillation center-of-gravity-specific natural vibration frequency $V_x$, and substituting this value into Math 4 will give a value smaller by approx. 63 kg for the unknown vehicle body weight M. Therefore, the error produced in the demonstration test in the second embodiment can be considered to be within the allowable range, and by extending the period of time for measurement with the acceleration sensor 21 and the angular velocity sensor 23, mathematically identifying a true frequency existing between the minimum frequencies, or repeating the measurement during traveling for averaging, the error can be minimized.

It is obvious that the present invention is not limited to the above-mentioned embodiments, and within the technical scope of the present invention, the above-mentioned embodiments may be altered as appropriate. For example, the present embodiments have been explained on the assumption that the cargo vehicle 10 as a mobile body is a truck, the present invention is applicable to railway vehicles, which are cargo vehicles 10. In addition, the number, location, geometry, and the like, of the above-mentioned component members are not limited to those as given in the above-mentioned embodiments, and may be altered into a number, location, geometry, and the like, that are suited for implementing the present invention. In each figure, the same component is provided with the same reference sign.

DESCRIPTION OF SYMBOLS

The symbol 1 denotes a cargo; 2 a virtual spring; 10 a cargo vehicle; 11 a cargo bed; 12 a driver's seat; 13 a vehicle axis; 20, 20a a vibration detection part; 21 an acceleration sensor; 22 an A/D converter; 23 an angular velocity sensor; 30, 30a a data processing part; 31, 31a an arithmetic part; 32 a storage part; 33 a touch panel; 34 a reporting part; 35 a reception part; 36 a bus; 40 an initial setting screen; 41 a vehicle body weight input field; 42 a cargo weight input field; 43 an initial setting pushbutton; 50 a measurement screen; 51 a measurement instruction pushbutton; 60 a weight notification screen; 70 a first initial setting screen; 71 a cargo weight input field; 72 a first initial setting pushbutton; 80 a second initial setting screen; 81 a cargo weight input field; and 82 a second initial setting pushbutton.

What is claimed is:

1. A loading weight detection device that detects the cargo weight of a cargo having an unknown weight that is loaded on a mobile body based on a correlation of oscillation and weight determined from a known cargo weight loaded on the mobile body, comprising:
   an initial setting input means for receiving an input of a vehicle body weight of said mobile body, a breadth between virtual springs in said mobile body, and the known cargo weight;
   an oscillation detection means for detecting an oscillation of said mobile body;
   a natural vibration identifying means for identifying, on the basis of oscillation data that has been detected by the oscillation detection means, the natural vibration in a self-weight direction of said mobile body as a vertical oscillation center-of-gravity-specific natural vibration value, and the natural vibration around a vehicle axis of said mobile body as a horizontal oscillation center-of-gravity-specific natural vibration value;
   a storage means for storing a first data comprising a first vertical oscillation center-of-gravity-specific natural vibration value and a first horizontal oscillation center-of-gravity-specific natural vibration value that have been identified by said natural vibration identifying means with cargo having said known cargo weight being loaded on said mobile body, and said vehicle body weight, said breadth between the virtual springs, and said known cargo weight that have been received by said initial setting input means as initial setting data;
   a total weight calculation means for calculating a total weight of said mobile body that is loaded with said cargo having the unknown weight on the basis of applying second data to a correlation derived from the first data, wherein the second data comprises a second vertical oscillation center-of-gravity-specific natural vibration value and a second horizontal oscillation center-of-gravity-specific natural vibration value that have been identified by said natural vibration identifying means with said cargo having an unknown weight being loaded on said mobile body; and
   a reporting part for reporting the unknown weight, wherein the unknown weight is determined by the difference of said total weight and said vehicle body weight.

2. The loading weight detection device according to claim 1, wherein said natural vibration identifying means applies fast Fourier transformation to time series oscillation data that has been detected by said oscillation detection means to identify said vertical oscillation center-of-gravity-specific natural vibration value and said horizontal oscillation center-of-gravity-specific natural vibration value.

3. The loading weight detection device according to claim 1, wherein said vertical oscillation center-of-gravity-specific natural vibration value and said horizontal oscillation center-of-gravity-specific natural vibration value that are identified by said natural vibration identifying means are natural vibration frequencies.

4. The loading weight detection device according to claim 1, wherein said total weight calculation means calculates a total weight of said mobile body in consideration of the height in the vertical direction from the oscillation center axis to the center-of-gravity location of said mobile body, the displacement in the horizontal direction from the oscillation center axis to the center-of-gravity location of said mobile body, and the static inclination angle of a cargo bed in said mobile body.

* * * * *